United States Patent
Biffert et al.

(10) Patent No.: US 12,029,197 B1
(45) Date of Patent: Jul. 9, 2024

(54) LIVESTOCK LOCATION TRACKING SYSTEM

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L. Mehring, Fargo, ND (US); Keith D. Alsleben, Fargo, ND (US); Braydon W. Love, Fergus Falls, MN (US); Chad A. Heath, Fargo, ND (US)

(73) Assignee: 701x Inc., Fargo, ND (US)

( * ) Notice: Subject to any disclaimer, the term of this patent is extended or adjusted under 35 U.S.C. 154(b) by 15 days.

(21) Appl. No.: 18/162,885

(22) Filed: Feb. 1, 2023

(51) Int. Cl.
*A01K 11/00* (2006.01)

(52) U.S. Cl.
CPC .......... *A01K 11/008* (2013.01); *A01K 11/001* (2013.01)

(58) Field of Classification Search
None
See application file for complete search history.

(56) References Cited

U.S. PATENT DOCUMENTS

| | | | |
|---|---|---|---|
| 4,461,241 A | 7/1984 | Ostler |
| 4,503,808 A | 3/1985 | McAlister |
| 4,512,096 A | 4/1985 | Heidecker |
| 5,711,246 A | 1/1998 | Yano |
| 5,791,294 A | 8/1998 | Manning |
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |
| 6,788,199 B2 | 9/2004 | Crabtree |

(Continued)

FOREIGN PATENT DOCUMENTS

| AU | 2017239570 A1 | 4/2018 |
|---|---|---|
| CN | 101221231 A | 7/2008 |

(Continued)

OTHER PUBLICATIONS

PCT International Search Report and Written Opinion for PCT/US2023/086378; Apr. 11, 2024.

(Continued)

*Primary Examiner* — Muhammad Adnan
(74) *Attorney, Agent, or Firm* — Neustel Law Offices

(57) ABSTRACT

A livestock location tracking system is used to establish a history of locations of livestock animals throughout their lifespan to determine time spent in pasture, in pens, at feed stations, and/or other locations of interest. The recordation of locations of livestock occurs within the context of a livestock management system that includes a management system platform, a remote computer system, one or more local sensors and/or transceivers, one or more advanced livestock tags, one or more basic livestock tags and/or enhanced basic livestock tags, and one or more mobile devices.

18 Claims, 7 Drawing Sheets

(56) References Cited

U.S. PATENT DOCUMENTS

| | | | |
|---|---|---|---|
| 6,868,804 B1 | 3/2005 | Huisma | |
| 6,997,140 B2 | 2/2006 | Finlayson | |
| 6,998,980 B2 | 2/2006 | Ingley, III | |
| 6,998,985 B2 | 2/2006 | Reisman | |
| 7,059,275 B2 | 6/2006 | Laitinen | |
| 7,164,986 B2 | 1/2007 | Humphries | |
| 7,234,421 B2 | 1/2007 | Natividade | |
| 7,218,229 B2 | 5/2007 | Boyd | |
| 7,248,167 B2 | 7/2007 | Wassingbo | |
| 7,335,168 B2 | 2/2008 | Rugg | |
| 7,411,492 B2 | 8/2008 | Greenberg | |
| 7,467,603 B2 | 12/2008 | Davies | |
| 7,525,425 B2 | 4/2009 | Diem | |
| 7,616,124 B2 | 11/2009 | Paessel | |
| 7,728,724 B1 | 6/2010 | Scalisi | |
| 7,830,257 B2 * | 11/2010 | Hassell | A01K 11/006 |
| | | | 340/539.22 |
| 7,904,244 B2 | 3/2011 | Sugla | |
| 7,918,185 B2 | 4/2011 | Araki | |
| 8,018,329 B2 | 9/2011 | Morgan | |
| 8,125,332 B2 | 2/2012 | Curran | |
| 8,149,125 B2 | 4/2012 | Geissler | |
| 8,285,245 B2 | 10/2012 | Ashley, Jr. | |
| 8,312,845 B2 | 11/2012 | Guinta | |
| 8,340,022 B2 | 12/2012 | Lee | |
| 8,849,926 B2 | 9/2014 | Marzencki | |
| 8,890,677 B2 | 11/2014 | Raphaeli | |
| 8,983,426 B2 | 3/2015 | Cermak | |
| 9,038,293 B2 | 5/2015 | Decaluwe | |
| 9,044,297 B2 | 6/2015 | Rajkondawar | |
| 9,370,170 B2 * | 6/2016 | Downing | G01K 13/223 |
| 9,448,072 B2 | 9/2016 | Bandyopadhyay | |
| 9,449,202 B2 | 9/2016 | Clare | |
| 9,489,813 B1 | 11/2016 | Beigel | |
| 9,504,387 B2 * | 11/2016 | Alonsoperez Lanza | |
| | | | A61B 5/0022 |
| 9,848,577 B1 * | 12/2017 | Brandao | A01K 11/004 |
| 9,936,676 B1 | 4/2018 | Ulmer | |
| 9,980,467 B2 | 5/2018 | Auer | |
| 10,075,813 B1 * | 9/2018 | Struhsaker | H04L 67/12 |
| 10,242,547 B1 * | 3/2019 | Struhsaker | H04W 4/021 |
| 10,292,370 B2 | 5/2019 | Mobley | |
| 10,660,546 B2 * | 5/2020 | Saigh | A61B 5/1121 |
| 10,697,947 B1 | 6/2020 | Armitage | |
| 11,503,802 B2 * | 11/2022 | Jones | G08C 17/02 |
| 2002/0046713 A1 | 4/2002 | Otto | |
| 2004/0074448 A1 | 4/2004 | Bunt | |
| 2004/0078390 A1 | 4/2004 | Saunders | |
| 2005/0162279 A1 | 7/2005 | Marshall | |
| 2006/0097882 A1 | 5/2006 | Brinkerhoff | |
| 2006/0161443 A1 | 7/2006 | Rollins | |
| 2006/0201432 A1 | 9/2006 | Pratt | |
| 2006/0267731 A1 | 11/2006 | Chen | |
| 2007/0012260 A1 | 1/2007 | Boyd | |
| 2007/0171048 A1 | 7/2007 | Shapiro | |
| 2007/0209594 A1 | 9/2007 | Kaever | |
| 2007/0229350 A1 | 10/2007 | Scalisi | |
| 2008/0147458 A1 * | 6/2008 | Yamazaki | A01K 29/00 |
| | | | 705/7.11 |
| 2010/0030036 A1 * | 2/2010 | Mottram | A61D 17/008 |
| | | | 119/858 |
| 2010/0127853 A1 | 5/2010 | Hanson | |
| 2010/0156606 A1 * | 6/2010 | Gold | H04Q 9/00 |
| | | | 340/10.4 |
| 2011/0102154 A1 * | 5/2011 | Hindhede | G01S 13/878 |
| | | | 340/10.1 |
| 2011/0125065 A1 | 5/2011 | Voronin | |
| 2011/0148639 A1 | 6/2011 | Geissler | |
| 2012/0050046 A1 | 3/2012 | Satorius | |
| 2012/0065483 A1 * | 3/2012 | Chung | A61B 5/0008 |
| | | | 600/309 |
| 2013/0175347 A1 | 7/2013 | Decaluwe | |
| 2013/0340305 A1 * | 12/2013 | Mobley | A01K 11/004 |
| | | | 40/300 |
| 2015/0097668 A1 | 4/2015 | Toth | |
| 2015/0282457 A1 * | 10/2015 | Yarden | A61D 17/002 |
| | | | 340/573.2 |
| 2015/0373951 A1 | 12/2015 | Kelly | |
| 2016/0143719 A1 | 5/2016 | Folkers | |
| 2017/0156288 A1 * | 6/2017 | Singh | A01K 11/002 |
| 2018/0048987 A1 | 2/2018 | Morris | |
| 2018/0054399 A1 * | 2/2018 | Shinoda | H04L 51/02 |
| 2018/0146645 A1 | 5/2018 | Arbel | |
| 2018/0160649 A1 * | 6/2018 | Hicks | A01K 39/012 |
| 2018/0279582 A1 * | 10/2018 | Yajima | A01K 29/005 |
| 2018/0295809 A1 * | 10/2018 | Yajima | H04B 17/318 |
| 2018/0374165 A1 * | 12/2018 | Ferro dos Santos | |
| | | | A01K 11/006 |
| 2019/0008124 A1 * | 1/2019 | Komatsu | G06F 3/14 |
| 2019/0141959 A1 * | 5/2019 | Ingham | A01K 11/004 |
| | | | 340/870.07 |
| 2019/0223408 A1 | 7/2019 | Brayer | |
| 2019/0254601 A1 | 8/2019 | Blackmore | |
| 2019/0380311 A1 * | 12/2019 | Crouthamel | A01K 11/004 |
| 2020/0022338 A1 | 1/2020 | Rovnyi | |
| 2020/0029534 A1 | 1/2020 | Austin | |
| 2020/0107522 A1 | 4/2020 | Kersey | |
| 2020/0125849 A1 | 4/2020 | Labrecque | |
| 2020/0159720 A1 | 5/2020 | Leong | |
| 2020/0160009 A1 * | 5/2020 | Vatn | G06K 7/10128 |
| 2020/0323170 A1 | 10/2020 | Garigan | |
| 2020/0367471 A1 | 11/2020 | Deliou | |
| 2021/0148881 A1 | 5/2021 | Deng | |
| 2022/0104929 A1 | 4/2022 | Cummins | |
| 2022/0192150 A1 | 6/2022 | Biffert | |
| 2022/0192151 A1 | 6/2022 | Biffert | |
| 2022/0192152 A1 | 6/2022 | Biffert | |
| 2022/0200519 A1 | 6/2022 | Biffert | |

FOREIGN PATENT DOCUMENTS

| | | |
|---|---|---|
| EP | 3188648 B1 | 1/2020 |
| FR | 2801491 A1 | 6/2001 |
| GB | 2387465 A | 10/2003 |
| WO | 2000011939 A2 | 3/2000 |
| WO | 2005034617 A1 | 4/2005 |
| WO | 2020120516 A1 | 6/2020 |
| WO | 2022005288 A1 | 1/2022 |

OTHER PUBLICATIONS

Atmel 8-Bit AVR Microcontroller with 2/4/8K Byes In-System Programmable Flash Datasheet; 2013. (Year: 2013).

Non-Final Office Action Document Received for U.S. Appl. No. 17/557,559.

http://www.sensehubbeef.com/; Allflex Livestock Intelligence "SenseHub Beef" Webpage.

http://www.sensehubbeef.com/documents/pdf/SenseHubBeef.pdf; Allflex Livestock Intelligence "SenseHub Beef" Cow Monitoring Brochure; Copyright 2018.

https://www.cerestag.com/; Ceres Tag Website.

https://web.archive.org/web/20200806065228/https://www.cerestag.com/benefits/; Internet Archive Wayback Machine Archive.org "Ceres Tag Benefits" Webpage; Aug. 6, 2020.

https://www.moovement.com.au/gps-ear-tags; mOOvement "GPS Ear Tag" Website.

https://ieeexplore.ieee.org/document/1280774; IEEE Xplore Webpage Article "Wearable Sensor System for Wireless State-of-Health Determination in Cattle"; L. Nagl; Sep. 17, 2003.

https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.

https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.

http://www.diva-portal.org/smash/get/diva2:21508/FULLTEXT01. pdf; Diva Article "Sensor Systems for Positioning and Identification in Ubiquitous Computing"; Suri Jayabharath Kumar; Feb. 13, 2006.

(56) References Cited

OTHER PUBLICATIONS https://www.beefcentral.com/ag-tech/gps-enabled-livestock-monitoring-tags-reach-the-commercial-market/; GPS-enabled livestock monitoring tags reach the commercial market; Beef Central; Mar. 17, 2020.
https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
PCT International Search Report and Opinion for PCT/US2021/064611; Apr. 27, 2022.
PCT International Search Report and Written Opinion for PCT/US2023/086390; Apr. 19, 2024.
https://www.gammon.com.au/power; "Power Saving Techniques for Microprocessors" Gammon Forum Webpage; Jan. 13, 2012.

\* cited by examiner

LIVESTOCK LOCATION TRACKING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to location tracking of livestock to establish a location history of the livestock throughout their lifespan.

Radio frequency identification (RFID) of livestock, through use of handheld RFID readers reading RFID tags attached to livestock, has been available to establish an inventory of livestock. However, use of RFID requires that the reader be in close proximity to the tag leaving it unknown as to a location of the livestock when the reader is not in proximity.

However, knowing the location of the livestock throughout a day and throughout their lifetime could provide valuable insight into the health of the livestock.

SUMMARY

Some of the various embodiments of the present disclosure relate to a livestock location tracking system that can be used to establish a history of locations of livestock animals throughout their lifespan to determine time spent in pasture, in pens, at feed stations, and/or other locations of interest. The recordation of locations of livestock occurs within the context of a livestock management system that includes a management system platform, a remote computer system, one or more local sensors and/or transceivers, one or more advanced livestock tags, one or more basic livestock tags and/or enhanced basic livestock tags, and one or more mobile devices.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1:
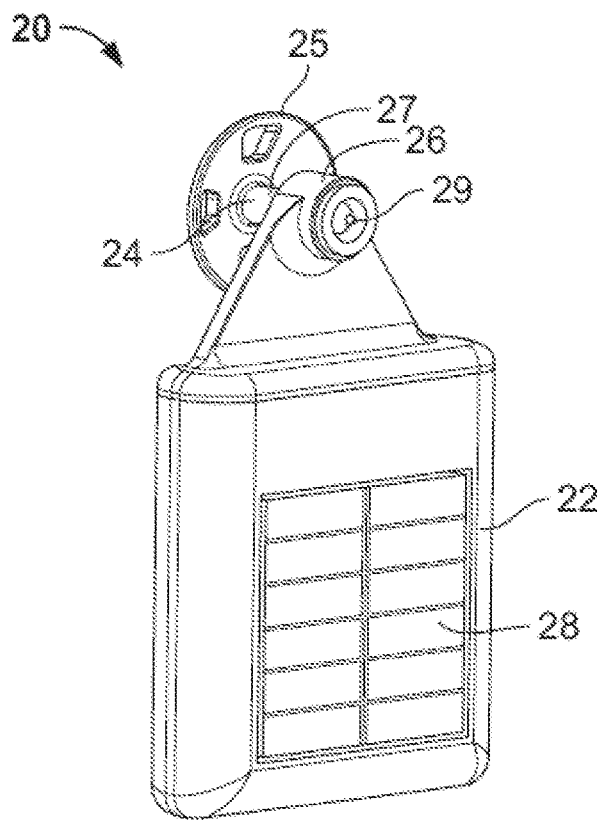
FIG. 1 is a perspective view of an advanced tag component of a livestock management system.

A. Overview.

Some of the various embodiments of the present disclosure relate to a livestock location tracking system that can be used to establish a history of locations of livestock animals throughout their lifespan to determine time spent in pasture, in pens, at feed stations, and/or other locations of interest. The recordation of locations of livestock occurs within the context of a livestock management system 10 that includes a management system platform 140, a remote computer system 220, one or more local sensors and/or transceivers 34, one or more advanced livestock tags 20, one or more basic livestock tags 230 and/or enhanced basic livestock tags 231, and one or more mobile devices.

In tracking the location of a livestock animal throughout their life (e.g., 18-24 months for a slaughter animal), a basic livestock tag 230 and/or enhanced basic livestock tag 231 is secured to a newly born livestock 12 animal (or to animal newly entering a herd). The basic tag 230 and/or enhanced basic tag 231 transmits its unique tag identifier to one or more of the local sensors and/or transceivers 34, to one or more of the advanced tags 20, and/or to one or more mobile devices.

Receipt of the unique tag identifier from the basic tag 230 and/or enhanced basic tag 231 at the local sensor and/or transceiver 34 prompts the local sensor and/or transceiver 34 to subsequently transmit the unique tag identifier and a date of reception of the unique tag identifier having been received at the local sensor and/or transceiver 34 to the livestock management system 10 along with a location of the local sensor and/or transceiver 34. The location of the local sensor and/or transceiver 34 and the date of reception at the local sensor and/or transceiver 34 are stored in association with unique tag identifier as a first location and a first date upon which the first location occurred for the basic tag 230 or enhanced basic tag 231.

Receipt of the unique tag identifier at the advanced tag 20 prompts the advanced tag 20 to subsequently transmit that unique tag identifier and a date of reception of the unique tag identifier having been received at the advanced tag 20 along with a location of the advanced tag 20 to the livestock management system 10 where the location of the advanced tag 20 and the date of reception at the advanced tag 20 are stored in association with unique tag identifier as a second location and a second date upon which the second location occurred for the basic tag 230 or enhanced basic tag 231.

Receipt of the unique tag identifier at the mobile device prompts the mobile device to subsequently transmit the unique tag identifier, a date of reception of the unique tag identifier having been received at the mobile device, and a location of the mobile device to the livestock management system 10 where the location of the mobile device and the date of reception at the mobile device are stored in association with the unique tag identifier as a third location and a third date upon which the third location occurred for the basic tag 230 or enhanced basic tag 231.

A roll call procedure 400 can also be used in tracking the location of livestock 12. The roll call procedure 400 is activated at the mobile device via an application operating in communication with the livestock management system 10. The roll call to be executed is defined by a plurality of parameters that can include but are not limited to which type of livestock is to be included in the roll call, which points of interests should be considered in the roll call, start time and/or duration of the roll call, etc. Responsive to activation of the roll call procedure, a listing of a plurality of unique tag identifiers expected to meet the one or more parameters of the roll call (e.g., the unique tag identifiers have already been associated with the one or more parameters within the livestock management system 10) is generated including the unique tag identifier of the basic tag 230 or enhanced basic tag 231. Subsequently, upon receiving the unique tag identifier of the basic tag 230 or enhanced basic tag 231 at the mobile device, the unique tag identifier within the listing is marked as being present. Based on the unique tag identifier being present within the listing, the mobile device transmits the unique tag identifier, a date of reception of the unique tag identifier having been received at the mobile device during roll call, and a location of the mobile device during roll call to the livestock management system 10 where the location of the mobile device during roll call and the date of reception at the mobile device during roll call are stored in association with the unique tag identifier as a fourth location and a fourth date upon which the fourth location occurred for the basic tag 230 or enhanced basic tag 231.

A history of locations of the unique tag identifier, and the livestock animal associated therewith, is generated by the livestock management system 10 based on one or more of the first date and first location, second date and second location, third date and third location, and the fourth date and fourth location.

It should be noted that while livestock location tracking is described in terms of tracking a basic tag 230 and/or enhanced basic tag 231, livestock location tracking can be similarly performed additionally or alternatively with advanced tags 20.

B. Livestock Management System.

A livestock management system 10 generally includes a plurality of advanced tags 20, basic tags 230 and/or enhanced basic tags 231 attached to a corresponding plurality of livestock 12 under management, a plurality of local sensors and transceivers 34 located in an area under management, a management system platform 140, and a remote computer system 220. In some other example embodiments, one or more sensors 32 are implanted in and/or attached to each livestock 12.

Each advanced tag 20, basic tag 230 and/or enhanced basic tag 231 is adapted and configured to be attached to a corresponding livestock 12 externally, preferably in an outer part of the livestock's ear. Each advanced tag 20 is self-powered and operates autonomously and automatically for the most part.

Each advanced tag 20 includes the elements and components necessary to acquire or receive, to process, maintain, and communicate data and information regarding the individual livestock 12 to which it is attached. Such data can include, but is not limited to, livestock location, movement, orientation, position and angle relative to other nearby livestock 12, physical parameters such as internal body temperature, etc. Each advanced tag 20 is adapted and configured to autonomously and automatically locally process received and acquired data regarding location, orientation, movement, etc. and physical parameters of the livestock 12 and to make determinations about activities and behaviors of the livestock by applying one or more models and/or algorithms. Such activities and behaviors can include, for example, but are not limited to, eating, drinking, ruminating, resting, ambulation, breeding, etc. Each advanced tag 20 is also adapted and configured to autonomously and automatically determine from the data and the determined activities and behaviors certain correlated livestock health and other significant physical conditions by applying one or more models. Such conditions can include, but are not limited to, illness, injury, estrus, ovulation, breeding, pregnancy, and calving.

Each advanced tag 20 is also adapted and configured to generate and communicate alarms and/or alerts in response to certain detected activities and/or conditions, and to receive and respond to alarms and/or alerts. Alarms or alerts is communicated, for example, to one or more mobile devices of a rancher, herd manager, etc. Detected conditions that can trigger an alarm or alert include, but are not limited to, estrus and calving. Detected activities that can trigger an alarm or alert can include, but are not limited to, lack of movement, a sudden physical shock and/or loud noise, maintaining a particular orientation for an extended period of time and/or a low/high heart rate for an extended period of time. Each advanced tag 20 can respond to an alarm or alert by taking an action including, but not limited to activating an LED, tone generator, and/or stimulator.

Each advanced tag 20 is also adapted and configured to communicate its data and determinations directly or indirectly with the management system platform 140 and with the remote computer system 220 via one or more long-range wireless networks. Such networks can include, but are not limited to, cellular, satellite, and or IP-based WAN/LAN networks, and/or LPWAN's such as LORA or Sigfox.

Each advanced tag 20 can also be adapted and configured to communicate with and to receive data from one or more sensors 32 that may be implanted in and/or attached to the livestock 12 to which the advanced tag 20 is attached over a wireless connection. The wireless connection is, but is not limited to, a low power Bluetooth (BLE) connection and an antenna-based RFID connection or other RF link. Each advanced tag 20 can further be adapted and configured to process, maintain, and communicate the data from the sensor(s) 32. The one or more sensors 32 is adapted and configured to sense various physical parameters, conditions, and/or activities of the livestock 12 including, but not limited to, body temperature, heart rate, and blood oximetry. In an example embodiment, a temperature sensor is implanted in or attached to the livestock 12 at a location that is spaced apart from the ear location where the advanced tag 20 is attached. For food safety reasons, the spaced apart location can include another location on the ear for example. The sensor 32 can provide relative body temperature readings of the livestock 12 that is closely correlated with the health-related and other physical conditions of the livestock 12 that the advanced tag 20 is to determine.

In addition to each advanced tag 20 being adapted and configured to communicate directly with the management system platform 140 and/or the remote computer system 220, e.g., in the cloud, in some embodiments each advanced tag 20 can also be adapted and configured to communicate directly with every other nearby advanced tag 20 that is within a certain signal range in a dynamic local mesh network. A plurality of dynamic local mesh networks is in existence at any given time in a herd under management. The dynamic local mesh networks are self-organizing such that as an individual livestock 12 leaves the signal range of one such network and enters the signal range of another, each network automatically updates its advanced tag membership and communicates the new membership information to the other advanced tags 20 in the network. The advanced tags 20 in each dynamic local mesh network communicate with each other over a wireless point-to-point connection. The wireless point-to-point connections can comprise, but are not limited to, low power Bluetooth (BLE) and/or LPWAN connections.

Each advanced tag 20 in a dynamic local mesh network at any given time is adapted and configured to receive all or a subset of the data of each other advanced tag 20 in the network and to transmit all or a subset of its own data to every other advanced tag 20 in the network. Each advanced tag 20 in the network can also be adapted and configured to determine the advanced tag 20 that is in the optimum condition to communicate the aggregated data of all of the advanced tags in the network to the management system platform 140 and/or the remote computer system 220, i.e., the cloud. That determination is made based on a plurality of factors including, but not limited to, relative power levels, relative signal strengths, and other relative transmission conditions. Each advanced tag 20 can further be adapted and configured to determine if and when to communicate the aggregated data of the advanced tags 20 in the local network to the management system platform 140 and/or to the remote computer system 220. That determination is made based on a plurality of factors including, but not limited to, the time and date, atmospheric conditions, signal conditions, and power level and/or other conditions of the advanced tag or conditions of the livestock. For example, conditions of the livestock that may trigger a communication of the aggregated data include the livestock 12's health or a change in health status or condition, including but not limited to estrus, calving, or a change in the livestock 12's position, such as when it is detected that the livestock 12 has left a designated area or entered an unauthorized area, e.g., has crossed beyond a geo-fence.

Each basic tag 230 transmits a unique identifier associated with a specific livestock animal over a short-range wireless network to other devices within the short-range wireless network including advanced tags 20 as well as local sensors and transceivers 34. The unique identifier transmitted by the basic tag 230 is received, for example, at an advanced tag 20 and forwarded to the management system platform 140 and/or remote computer system 220.

In some embodiments, the basic tag is enhanced, e.g., enhanced basic tag 231, to additionally include the ability to acquire and transmit orientation and movement data within the short-range wireless network. The orientation and movement data transmitted by the enhanced basic tag 231 is received, for example, at an advanced tag 20 and forwarded to the management system platform 140 and/or remote computer system 220.

The one or more local sensors and transceivers 34 are in fixed locations of an area 2 under management or are mobile (e.g., mobile smart device) within the area under management, and are preferably in one or more areas where livestock 12 also happen to be present from time to time. Each local sensor and/or transceiver 34 is adapted and configured to communicate with each advanced tag 20, basic tag 230, and/or enhanced basic tag 231 that is within a certain signal range and is a member of a dynamic local mesh network with those various tags. Each advanced tag 20 is adapted and configured to communicate with every local sensor and/or transceiver 34 that is within signal range, and to receive, maintain, process, and communicate any data received therefrom. Local sensors can include for example, but are not limited to, a weight sensor connected to a scale, a photo-sensor and/or camera mounted on or near a scale, a photo-sensor and/or camera mounted on or near a feed or water source, a feed or water level sensor, etc. Local transceivers can also be used to communicate data between the advanced tags 20 that are in signal range, the management system platform 140, and/or the remote computer system 220, for example when other forms of communication, e.g., cellular or LPWAN are not available for some reason.

The management system platform 140 is hosted in a fixed location, such as on a desktop PC or on a cloud platform, or in a mobile device such as a laptop PC, tablet computer, mobile phone, etc. Instances of all or a portion of the management system platform 140 is distributed between one or more host devices at a fixed location and one or more mobile host devices.

The management system platform 140 is adapted and configured to receive, process, and maintain the data and determinations by the advanced tags 20, basic tags 230, and/or enhanced basic tags 231 attached to the livestock 12 under management. The management system platform 140 is adapted and configured to communicate directly with the advanced tags 20 and with the remote computer system 220 via one or more wireless and/or wired networks. The networks can include, but are not limited to, cellular, satellite, and/or IP-based WAN/LAN networks, and/or LPWAN's such as LORA or Sigfox. To the extent the management system platform 140 is embodied in a mobile host device, it can also be adapted and configured to communicate with advanced tags 20, basic tags 230 and/or enhanced basic tags 231 via a shorter range wireless connection, including but not limited to a Bluetooth connection. The management system platform 140 also is adapted and configured to communicate with advanced tags 20 basic tags 230 and/or enhanced basic tags 231 that are within signal range via a local RF transceiver in proximity to the advanced tags 20, basic tags 230 and/or enhanced basic tags 231 in the event other communication connections are unavailable for any reason.

The management system platform 140 is adapted and configured to process the livestock advanced tag data in substantially the same way as the individual advanced tags 20. The management system platform 140 can track the locations and movements of individual livestock 12 and the herd under management in general, and can use models and/or other algorithms to determine certain activities and behaviors, the existence of certain events, and the existence of certain physical conditions such as estrus and calving in individual livestock 12, among other things. The management system platform 140 is also adapted and configured to respond to the detection of such events and the determination of such physical conditions by taking actions that can include, but are not limited to, communicating an alarm or alert to one or more mobile devices of a rancher, herd manager, etc., and causing the advanced tag 20 associated with the event or physical condition to take an action such as activating a tone generator, stimulator, and/or LED.

The management system platform 140 is also adapted and configured to manage the various tags and to monitor the operational condition of each advanced tag 20. The management system platform 140 is adapted and configured to add new ones of the various tags to the system, delete various tags from the system, populate advanced tags 20 with data and updates, and provision advanced tags 20 for operation in the system. The management system platform 140 can monitor operational conditions of the advanced tags 20 that can include, but are not limited to, battery level, signal strength level, temperature, humidity, etc. The management system platform 140 can take actions including generating and communicating an alarm or alert when a monitored condition indicates a need for service, repair or other intervention.

The management system platform 140 is also adapted and configured to process the data and determinations from the various tags and to produce additional data and information that is beneficial to managing a herd of livestock 12. Such data and information can include both individual and herd level data and information. At an individual level, such data and information can include for example, but is not limited to, genetic and family lineage, history of physical characteristics such as weight, health and medical history, individual market value, anticipated costs etc. At a herd level, such data and information can include for example, but is not limited to, herd demographics and statistics, herd market value, actual and anticipated costs, herd location relative to pasturage, and the status of use and remaining inventories of pasturage, feed, medical supplies, and/or other consumables.

The management system platform 140 also is adapted and configured to receive, process, maintain and communicate external information related to management of individual and herds of livestock 12. Such information can include, but is not limited to, ownership information and history, location information and history, health related and other physical condition information and history such as records of veterinary visits and treatments, vaccination, injury, and illness, market prices for livestock, market prices for feed and other consumables, financial information such as interest rates, debt service, etc., and weather information. The management system platform 140 is adapted and configured to include certain triggers to automatically generate alarms or alerts to a user of the system when certain predetermined threshold values are detected. Such triggers and alerts can include, but are not limited to, an alert to buy or sell when a certain market price is detected, an alert to move all or a portion of the herd when a certain usage value of pasturage or a certain weather condition is detected, and an alert to have vaccinations updated when an amount of time has elapsed or a certain date and/or illness has been detected.

The management system platform 140 can also be adapted and configured to provide one or more external access interfaces. The external access interfaces can include login/password access security. The management system platform 140 is configured to limit access to only designated portions of the management system platform functions, data and information, either based on password control or otherwise. For example, one or more external access interfaces is set up to provide access to certain information by one or more banks or other financial institutions, insurance providers, and/or government agencies. The management system platform 140 can also be configured to operate as a remote service provider for certain on-line services, such as veterinary services, auction house services, or other livestock management related services. In that case, external access interfaces can also be set up to provide access to such services by registered users.

It is expected that once an advanced tag 20 is activated and placed in service, it will generate masses of data and determinations over time. The management system platform and/or the remote computer system 220 is adapted and configured to aggregate and maintain the data and determinations, both current and historical, by all advanced tags 20 as well as basic tags 230 and/or enhanced basic tags 231 of a herd under management. Such data and determinations are used to create, develop, train, and subsequently update one or more machine learning or artificial intelligence (AI) models and/or one or more other detection algorithms for determining livestock activity, behavior, and conditions. Such models can then be embedded in the advanced tags 20 and applied to data, e.g., location, orientation, movement, physical parameter values, received and acquired by the advanced tags 20 in real time, and to determinations made therefrom by the advanced tags 20 in real time to accurately determine the occurrence or existence of various significant physical conditions of the livestock 12 including, but not limited to, estrus, breeding, and calving.

After a model or algorithm, or model or algorithm update, is generated, the management system platform 140 or the remote computer system 220 can download it to the individual advanced tags 20. Each individual advanced tag 20 is adapted to receive the models and/or algorithms and updates, store them, and apply them with respect to the real time data and determinations of the advanced tag 20, the basic tag 230, and/or enhanced basic tag 231. As one example, an advanced tag 20 can apply a model or algorithm to determine that a livestock 12 is in estrus using as parameters the orientation of the advanced tag 20 (indicating a first behavior of the livestock 12), elevation of the advanced tag 20, the movement of the advanced tag 20 (indicating a second behavior of the livestock 12), and the relative body temperature of the livestock 12 from a sensor 32 (indicating a physical parameter of the livestock 12).

The remote computer system 220 is separate from or is a part of the management system platform 140. The remote computer system 220 can communicate directly with the advanced tags 20 and with the management system platform 140 via one or more long-range wired and/or wireless networks including, but not limited to, cellular, satellite, and/or IP-based WAN/LAN networks, and/or LPWAN's such as LORA or Sigfox.

The remote computer system 220 preferably includes mass storage, e.g., one or more high capacity, high performance remote/cloud storage servers, with sufficient capacity to maintain the masses of data and determinations generated by all of the advanced tags 20 of a herd under management over time. The remote computer system 220 also preferably includes sufficient processing capacity and power, e.g., one or more high performance central processing units, and the necessary tools and facilities to perform machine learning on the masses of data and determinations and to create, train, and update desired models and/or other detection algorithms to be downloaded to and embodied in the advanced tags 20.

1. Advanced Tag.

Figure 2:
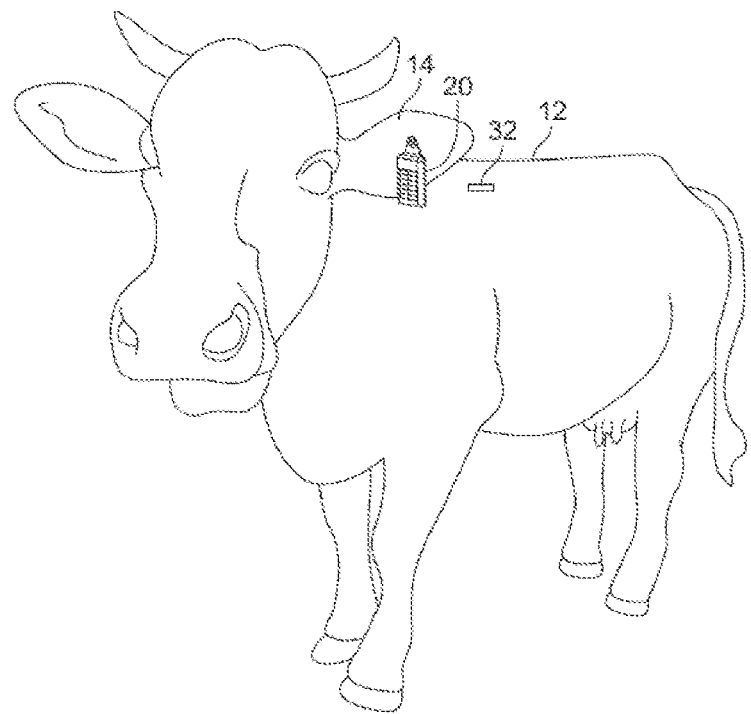
FIG. 2 is a perspective view of a graphical representation of a livestock fitted with an advanced tag component of a livestock management system.

Each individual advanced tag 20 is adapted to be attached to an individual livestock 12. The individual livestock 12 is managed individually and is part of a plurality or herd of livestock 12 being managed. Each advanced tag 20 is preferably adapted to be physically attached to an external body part of an individual livestock 12 in a location where the advanced tag 20 will be both readily visible and readily physically accessible. For example, as illustrated in FIG. 2, the advanced tag 20 may be attached to the outer ear.

Each advanced tag 20 is self-powered and includes the data collection, processing, storage, communications, control and other elements components, including code, to receive, process, retain, and communicate data regarding the individual livestock 12 to which it is attached as well as aggregated livestock data. Such data may include, but is not limited to, livestock location, movement, orientation, position relative to other livestock, physical parameters, etc. Each advanced tag 20 is adapted and configured to locally process received 9 and acquired data regarding physical parameters and activity of the livestock 12 to which it is attached using one or more models to determine the occurrence of various behaviors and correlated physical conditions.

Each advanced tag 20 is self-powered and includes a self-contained power system within the enclosure 22. In certain embodiments, the power system 40 includes an external energy collector, e.g., solar cells 28, and a power source 42. The power source 42 may include, for example, a voltage regulator, a charging circuitry, and rechargeable energy storage.

Figure 3:
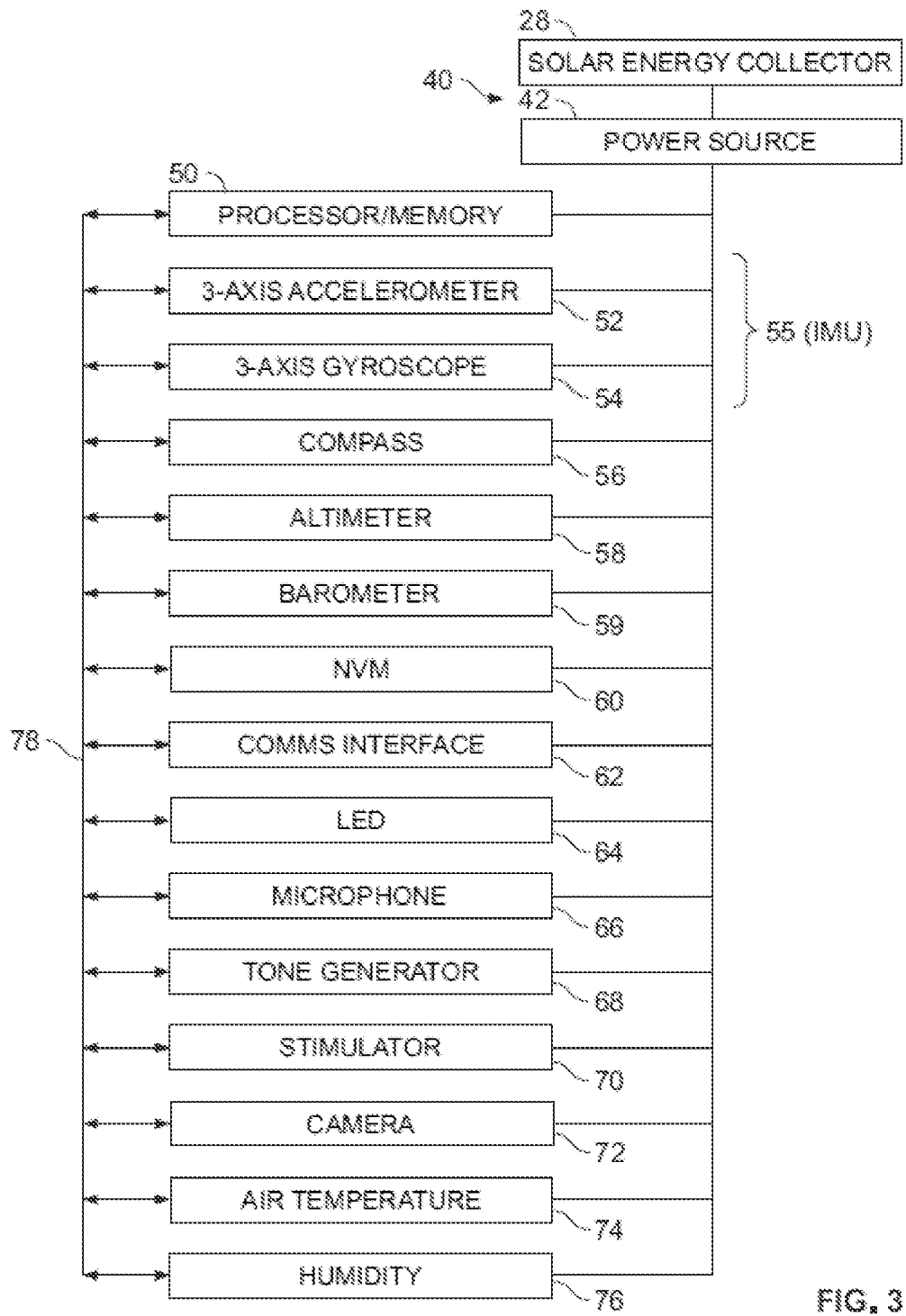
FIG. 3 is a block diagram illustrating the elements and architecture of advanced tag component of a livestock management system.

As illustrated in FIG. 3, the data collection, processing, storage, communications, and control components and elements of each advanced tag 20 may include a processor and memory element 50, a three-axis accelerometer 52, a three-axis gyroscope 54, a compass 56, an altimeter 58, a barometer 59, non-volatile memory (NVM) 60, a communications (COMMS) interface 62, one or more LED's 64, a microphone (MIC) 66, a tone generator and speaker, a stimulator 70, a camera 72, an air temperature sensor 74, and a humidity sensor 76. The three-axis accelerometer 52 and the three-axis gyroscope 54, collectively, may comprise or be referred to as an Inertial Measurement Unit 55. When the accelerometer 52 is being used, the gyroscope 54 may also be used in unison to detect motion of the livestock 12. The processor 50 is connected to and communicates with each of the elements and components via a bus 78. The processor 50 also communicates with and controls the power source 42 and the communications interface 62.

The communications (COMMS) interface 62 provides interfaces to a number of different communication channels over which the advanced tag 20 can communicate. These include channels for communicating with one or more sensors 32 implanted in and/or attached to the livestock 12 to which the advanced tag 20 is attached, with other nearby advanced tags 20, with nearby local sensors and transceivers 34, with the management system platform 140, with the remote computer system 220, and with global positioning satellites 83.

Figure 4:
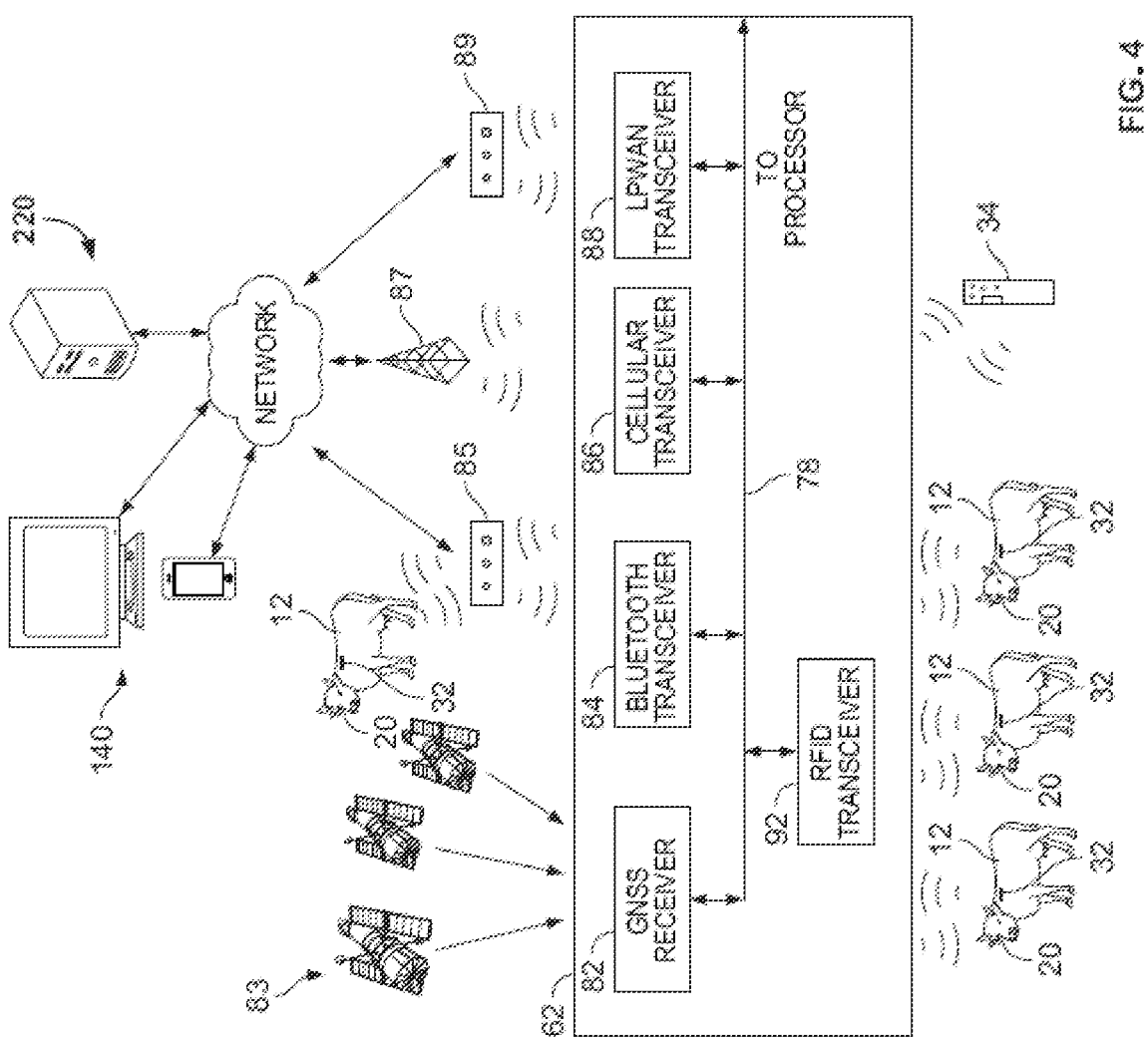
FIG. 4 is a combination block diagram illustrating the elements and architecture of a communications interface of an advanced tag component of a livestock management system and graphical representation illustrating communication relationships between the communications interface and other elements of the system.

Referring to FIG. 4, each advanced tag 20 is adapted and configured to communicate via its communications interface 62 with one or more sensors 32 implanted in and/or attached to the livestock 12 to which the advanced tag 20 is attached, with the management system platform 140, with the remote computer system 220, with any other nearby advanced tags 20, and with any nearby local sensors and transceivers 34. The communications interface 62 of each advanced tag 20 can include a global navigation satellite system (GNSS) receiver 82, and one or more of a Bluetooth transceiver 84, a cellular network transceiver 86, a satellite data network transceiver, one or more LPWAN transceivers 88, and an RFID transceiver 92. Although not identified separately, each receiver and transceiver has a suitable corresponding antenna or antennas. Each of the receivers and transceivers of the communications interface 62 communicates with the processor 50 over the bus 78. The receivers and transceivers may each be separate or one or more of them may be integrated in one or more chips and/or packages with each other and/or with other components, or may be included within the processor 50. For example, in one embodiment the Bluetooth and LPWAN transceivers 84, 88 could be integrated with the processor 50 and one or more of the GNSS receiver 82, satellite data transceiver, and cellular transceiver 86 could be integrated with each other or another component. The GNSS receiver 82 receives global satellite positioning signals from satellites 83 and determines from the signals the position of the advanced tag 20 and hence the livestock 12 to which it is attached in terms of latitude and longitude.

The Bluetooth transceiver 84 is operative to transmit and receive data wirelessly with other nearby Bluetooth transceivers that are within Bluetooth signal range. The Bluetooth transceiver 84 may comprise a commercially available Bluetooth transceiver, and preferably a Bluetooth Low Energy (BLE) transceiver having lower power consumption than traditional Bluetooth transceivers. In addition to each of the advanced tags 20, Bluetooth transceivers 84 may also be embedded in sensor(s) 32 implanted in and/or attached to the livestock 12 to which the advanced tags 20 are attached and in local sensors and transceivers 34 that are located in various areas or locations of a property under management where livestock 12 may be present.

It will be appreciated that the Bluetooth transceiver 84 is one particular type of RF transceiver that can form a type of wireless local area network (LAN) and that is suitable for relatively short range wireless communications at relatively low data rates. It is contemplated and will be appreciated that other types of wireless communications transceivers or interfaces such as a Wi-Fi transceiver, e.g., IEEE 802.11a, b, g, n, may be used in addition to or in lieu of the Bluetooth transceiver 84. Wi-Fi transceivers are generally able to transmit data at considerably higher data rates and over greater distances than Bluetooth transceivers. However they also consume more power than Bluetooth transceivers.

Bluetooth transceivers also may be embedded in one or more commercially available Bluetooth gateways or hubs 85 that may be located in one or more areas or locations of a property under management where livestock 12 may be present. The Bluetooth gateways/hubs 85 in turn may have one or more wireless and/or wired connections to one or more other data networks to which the management system platform 140 and/or the remote computer system 220 are connected. Such other networks may include, for example, a TCP/IP-based LAN or an HTTP-based WAN such as the Internet. The Bluetooth gateways/hubs 85 thus provide nearby advanced tags 20 that are within Bluetooth signal range with at least one longer range communication channel for the advanced tags 20 to wirelessly and directly communicate with the management system platform 140 and/or the remote computer system 220. One or more Bluetooth gateways or hubs 85 also may be adapted and configured to function as Bluetooth repeaters. In that case, advanced tags 20 that are not in Bluetooth signal range of each other can still communicate with each other wirelessly via Bluetooth.

The cellular network transceiver 86 is operative to wirelessly transmit and receive data to and from the advanced tag 20 over relatively long distances (longer than Bluetooth or Wi-Fi) via one or more cellular networks. Such a longer range communication channel enables the advanced tag 20 to send and receive data even when the livestock 12 to which it is attached is not in proximity to a shorter range transceiver such as Bluetooth, for example when the livestock 12 is on an open range. The cellular network transceiver 86 may be a commercial available transceiver that is adapted and configured to communicate data over one or more cellular networks, including but not limited to, CDMA, WCDMA, GSM, GPRS, LTE, EDGE, UMTS, and iDEN-based cellular networks. The cellular network transceiver 86 communicates data with one or more cell towers 87 within cellular signal range. Commercially available cellular network transceivers are generally capable of transmitting data signals to cell towers 87 up to about forty-five miles away depending on conditions. The cell towers 87 may communicate data in both directions between individual advanced tags 20 and the management system platform 140 and/or the remote computer system 220 directly over the cellular network or over the cellular network and an intermediate LAN or WAN network, including but not limited to the Internet. The data communicated may be data of an individual advanced tag 20 or data aggregated from a plurality of advanced tags in a dynamic local mesh network as described further below. One or more cellular boosters, repeaters, and/or gateways may also form part of the cellular communications 26 channel between the advanced tag 20 and the management system platform 140 and/or remote computer system 220.

If included, the satellite data network transceiver is in addition to the GNSS receiver 82. The satellite data network transceiver is operative to wirelessly transmit and receive data to and from the advanced tag 20 over relatively long distances (longer than Bluetooth or Wi-Fi) similar to the cellular network transceiver 86, except via one or more satellite data networks such as Orb COMM, Iridium, or Globalstar for example.

The LPWAN transceiver 88 is operative to wirelessly transmit and receive data to and from the advanced tag 20 over relatively long distances (longer than Bluetooth or Wi-Fi) with very low power consumption. The LPWAN transceiver 88 is a commercially available LPWAN transceiver such as a LORA or Sigfox transceiver. The LPWAN transceiver can comprise one or more different LPWAN transceivers. LPWAN transceivers 88 are specifically designed for use in applications requiring very low power consumption, e.g., battery-powered IoT sensor applications, and currently are capable of communicating data over distances up to about thirty miles depending on conditions. Like the cellular and satellite network communication channels, the LPWAN communication channel enables the advanced tag 20 to send and receive data even when the livestock 12 to which it is attached is not in proximity to a shorter range transceiver such as Bluetooth, for example when the livestock 12 is on an open range. Commercially available LPWAN transceivers are generally smaller and consume less power than comparable commercially available cellular and satellite transceivers, but generally have lower bandwidth and data rates. The LPWAN transceiver 88 can communicate data with one or more LPWAN gateways 89 within signal range. The LPWAN gateways 89 may communicate data in both directions between individual advanced tags 20, and between advanced tags 20 and the management system 23 platform 140 and/or the remote computer system 220 via one or more intermediate LAN, WAN, cellular and/or satellite networks. The data communicated may be data of an individual advanced tag 20 or data aggregated from a plurality of advanced tags 20 in a dynamic local mesh network as described further in the sections below. One or more signal boosters and/or repeaters may also form part of the LPWAN communications channel between the advanced tag 20 and other advanced tags, and/or between the advanced tag 20 and the management system platform 140 and/or remote computer system 220.

If included, the RFID transceiver 92 is operative to transmit and receive data 2 wirelessly with other nearby RFID transceivers that are within signal range. The RFID transceiver 92 may comprise a commercially available RFID transceiver. In addition to each of the advanced tags 20, RFID transceivers 92 may also be embedded in sensor(s) 32 implanted in and/or attached to the livestock 12 to which the advanced tags 20 are attached and in local sensors and transceivers 34 that are located in various areas or locations of a property under management where livestock 12 may be present. Such sensor(s) 32 and local sensors and transceivers 34 are described further below. Each advanced tag 20 is thus adapted and configured to communicate wirelessly and directly with the sensor(s) 32 implanted in and/or attached to the livestock 12 to which the advanced tag 20 is attached, and with every other nearby advanced tag 20 and every local sensor and transceiver 34 within RFID signal range via their respective RFID transceivers 92.

It will be appreciated that some or all of the communication functions performed by the RFID transceiver 92 embedded in the advanced tag 20 may also be performed by the Bluetooth transceiver 84 and/or the LPWAN transceiver 88. Accordingly, an RFID transceiver 92 may not be necessary and may not be included in all embodiments.

If an RFID transceiver 92 is included, in lieu of embedding it in the advanced tag 20, it may be embedded in a chip that is implantable in an ear or other body part of the livestock 12 separate from the advanced tag 20. In that case, the chip and the RFID transceiver 92 may be powered externally by sunlight, a laser light, or by energy from an external RFID reader or scanner. Upon being powered up, the chip and RFID transceiver 92 would be adapted and configured to communicate directly with the advanced tag 20 and to transfer its information directly to the advanced tag 20. The chip can also be read by a scanner/reader, for example to identify an animal with which an advanced tag 20 is associated when the advanced tag 20 has become detached and fallen off the animal. Such data could include, but is not limited to, information identifying the livestock 12 and associated advanced tag 20, e.g., unique identification number and advanced tag ID. The chip and RFID transceiver 92 could thus operate as a redundant backup of the advanced tag data should the advanced tag 20 become detached, damaged, or otherwise unavailable or unusable.

Figure 5:
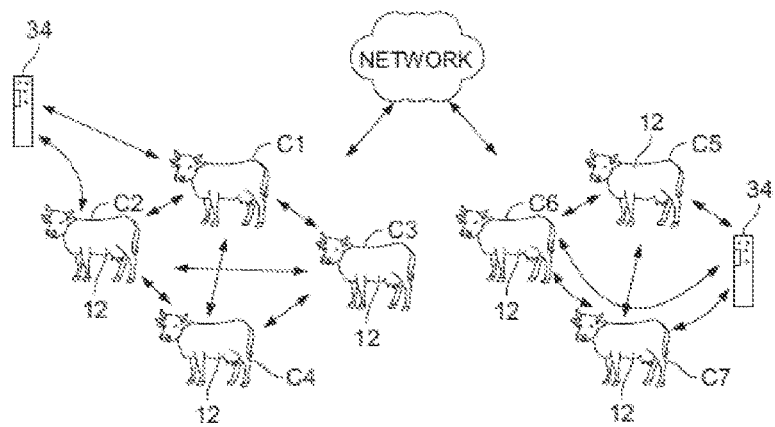
FIG. 5 is a graphical representation of livestock in multiple dynamic local mesh networks within a livestock management system.

As noted above and as illustrated in FIGS. 5, the advanced tags 20 are adapted and configured so that when they are attached to livestock 12 they can communicate with other nearby advanced tags 20, and nearby local sensors and transceivers 34 and autonomously and automatically organize into one or more dynamic local mesh networks. Depending on the relative locations of the individual livestock 12 of a herd under management at any given time, one or more dynamic local mesh networks may be formed and exist. In addition, as the livestock 12 move and change location relative to each other, the nodes or members, e.g., advanced tags 20 and livestock 12, of various dynamic local mesh networks may dynamically and automatically change as well as the locations of the networks themselves. It is contemplated that in practice with relatively large herds under management, dynamic local mesh networks in excess of 20,000 advanced tags 20, may be formed when livestock are aggregated in a relatively small area of several acres, for example for transportation, sale, slaughter, or at a feedlot. This could lead to situations where advanced tags 20 attached 16 to livestock 12 belonging to different owners or users of the livestock management system 10 could share data between them and communicate aggregated data of different owners or users to the management system platform 140.

Each advanced tag 20 is adapted and configured to receive all or a subset of the livestock-related and/or other data, e.g., operational data, of each other advanced tag 20 in a dynamic local mesh network and to transmit all or a subset of its own livestock-related and/or other data to every other advanced tag 20 in the network.

Each advanced tag 20 is configured to determine from its own data and/or from the aggregated data of the advanced tags 20 in a dynamic local mesh network which advanced tag 20 is in the optimum condition to communicate the aggregated data of the advanced tags 20 to the management system platform 140 and/or the remote computer system 220 via one of the communications channels described above, e.g., cellular, satellite, Bluetooth, and/or LPWAN. That determination may be made based on a plurality of factors including, but not limited to, relative power levels, relative signal strengths, and relative conditions for transmission, e.g., atmospheric or meteorological conditions.

The advanced tag 20 can also acquire data and information about and from other advanced tags 20. The advanced tag 20 also acquires or detects data and information about itself. The advanced tag 20 also can acquire or receive data and information from local sensors and transceivers 34 that are within signal range. For example, such data and information can include, but is not limited to, the weight of the livestock 12 from a scale, the presence of a livestock 12 at a feed or water station from a proximity or presence sensor, etc. The advanced tag 20 also can acquire or receive data and information from the management system platform 140 and/or the remote computer system 220.

The advanced tag 20 can detect, monitor, and track the absolute location of the livestock 12 and determine whether the livestock 12 is within a designated pasture area and identifying the pasture area. This data is used to manage the livestock 12 usage of available pasture areas. Among other data and parameters stored in the advanced tag 20, the coordinates that define one or more virtual perimeter boundaries or geo-fences in connection with an area under management, e.g., a ranch, is stored, for example in the non-volatile memory 60. Such virtual perimeter boundaries or geo-fences may, for example, be defined to extend around one or more designated pasture areas within the area under management. The advanced tag 20 is adapted and configured to determine if the livestock 12 is within one of the designated pasture areas and to identify the designated area by plotting or comparing the absolute location of the livestock 12 relative to the coordinates of each pasture area bounded by a virtual boundary or geo-fence. If the location of the livestock 12 is within the range of coordinates corresponding to a pasture area bounded by the virtual boundary, the livestock 12 is determined to be within the pastured area. Otherwise, it is not; optionally an alert can be generated by the livestock management system 10 to notify a user that a livestock 12 is out of range.

The advanced tag 20 also can detect, monitor, and track the absolute location of the livestock 12, and can determine the amount of time the livestock 12 has been present in a particular designated pasture area. Together with data regarding certain livestock activity, e.g., eating, this data is used to manage livestock 12 usage of available pasture areas as well to monitor livestock 12 intake. The advanced tag 20 is adapted and configured to acquire the location of the livestock 12 from the GNSS receiver 82 repeatedly at periodic time intervals and to store each instance of the acquired location in its local memory with the corresponding date and time the location was acquired. The advanced tag 20 is adapted and configured to determine the elapsed time the livestock 12 was present in a designated pasture area from the difference between the dates and times when the livestock 12 location was determined to be within the range of coordinates corresponding to the designated pasture area and when it was determined to not be within the range. The advanced tag 20 also can detect, monitor, and track the absolute location of the livestock 12 and monitor and track where and when the livestock 12 has eaten, and perhaps how long it ate. The advanced tag can also detect, monitor, and track the absolute location of the livestock 12 and determine the number of times the livestock 12 goes to a point of interest in an area under management. Points of interest can include for example feed and/or water stations or sources, bogs, barns, cliffs, gates, chutes, alleys, roads, shelters, minerals, houses, etc.

The advanced tag 20 can also be configured and adapted to detect the presence of the livestock 12 at a particular feed or water station or other point of interest by communication with a local sensor and transceiver 34 located at or near the point of interest. For example, an RFID reader or scanner, a photocell, or another sensor may detect the presence of the advanced tag 20 and/or the livestock 12 at or near a particular feed or water station, a bog, barn, etc. and communicate that data and the identity of the point of interest to the advanced tag 20. The advanced tag 20 also can detect, monitor, and track the absolute location of the livestock 12 and determine whether the livestock 12 has crossed over a perimeter boundary or geo-fence of a pasture area or of the area under management. In addition to detecting, monitoring, and tracking the absolute location of the livestock 12, the advanced tag 20 also can detect, monitor, and track the relative position and orientation of the livestock 12 relative to other nearby livestock 12 and can use such data to determine the health of the livestock 12 and the health of a livestock's young, such as a calf.

The advanced tag 20 is adapted and configured to generate and communicate or transmit alarms and alerts in response to certain conditions, events, and/or occurrences detected and/or determined by the advanced tag 20. The advanced tag 20 can communicate the alarms and alerts to the management system platform 140, the remote computer system 220, and/or to one or more mobile and/or stationary devices of a rancher, herd manager, owner, etc. The alarms and alerts also can comprise certain local actions by the advanced 9 tag 20, such as activating the LED 64, tone generator 68, and/or stimulator 70. The advanced tag 20 can communicate the alarms and alerts in the form of email, text messages, or direct device to device communications. The content of the alarms and alerts can vary depending on the conditions, events, and/or occurrences that caused the advanced tag 20 to generate them. The advanced tag 20 can communicate the alarms and alerts via the cellular transceiver 86 over a cellular network, via the satellite data network transceiver over a satellite network, via a LAN or WAN network, via the LPWAN transceiver 88 with or without a gateway 89, or via the Bluetooth transceiver 84 and a suitable gateway 85.

2. Local Sensors and Transceivers.

One or more of the local sensors and/or transceivers 34 is in one or more fixed locations of an area under management or is mobile within one or more designated areas of the area under management, preferably at one or more fixed locations or within one or more designated areas where livestock 12 also are present from time to time. The local sensors and/or transceivers 34 are adapted and configured to communicate with the advanced tags that are within range and to become a member of a dynamic local mesh network with such advanced tags 20 as described above. Some or all of the local sensors and/or 26 transceivers 34 can also be adapted and configured to communicate with the management system platform 140 and/or the remote computer system 220 separately from the advanced tags 20.

Similar to the advanced tags 20, the local sensors and/or transceivers 34 can include Bluetooth transceivers and RFID transceivers (which may be 915 MHz transceivers). The local sensors and/or transceivers 34 are adapted and configured to communicate with the advanced tags 20 within range locally using either or both of these transceivers. Also similar to the advanced tags 20, the local sensors and/or transceivers 34 can include cellular, satellite, and/or LPWAN transceivers. The local sensors and/or transceivers 34 is adapted and configured to communicate remotely with the management system platform 140 and/or the remote computer system 220 using any or all of these transceivers.

One or more local sensors and/or transceivers 34 in one or more fixed, known locations is coupled to and adapted and configured to communicate data between various local devices described herein, the advanced tags 20 that are within range, and the management system platform 140 and/or the remote computer system 220. As one example, a local sensor and transceiver 34 is connected to, is part of, or is otherwise in communication with a scale that livestock 12 are herded to cross over, for example in a chute leading in or out of a corral or feedlot. The scale automatically weighs each livestock 12 as it crosses and the local sensor and transceiver 34 receives the weight data, reads the ID of the advanced tag 20, basic tag 230, and/or enhanced basic tag 231 attached to the livestock 12, associates the weight data with the respective tag ID, and communicates the weight data and respective tag ID to the management system platform 140 and/or the remote computer system 220 to automatically track the weights of the livestock 12. The local sensor and transceiver 34 can also communicate the weight data of each livestock 12 locally to the attached advanced tag 20 for local storage and weight tracking by the advanced tag 20. As another example, local sensors and transceivers 34 is located at or near one or more feed stations or sources and/or one or more water stations or sources. As still another example, a plurality of local sensors and transceivers 34 is located at spaced apart fixed locations corresponding to boundaries of one or more designated areas within the area under management or the perimeter of the area under management. As yet another example, local sensors and transceivers 34 is placed in one or more corrals, chutes, gates, or other designated areas livestock 12 must pass nearby to obtain selected information from the advanced tags 20 and to communicate the data to the management system platform 140 to automatically track the status of the livestock 12.

Local sensors and/or transceivers 34 can also be placed in one or more mobile devices within one or more designated areas of an area under management. As one example, a local sensor and transceiver 34 is present in a mobile phone or mobile computing device carried by a rancher, herd manager, ranch hand, etc. As another example, a local sensor and transceiver 34 can also be placed on or in a drone or vehicle remotely controlled by a rancher, herd manager, etc. The local sensor and transceiver 34 can read the ID's of nearby advanced tags 20 and the mobile device can display or otherwise communicate them to the rancher, herd manager, etc. so that one or more is selected.

The local sensors and/or transceivers 34 can also be adapted and configured to communicate data between the advanced tags 20 and the management system platform 140 and/or the remote computer system 220 when an advanced tag 20 is within Bluetooth or LPWAN signal range of a corresponding Bluetooth or LPWAN transceiver of a local sensor and transceiver 34. The local sensor and transceiver 34 can in turn communicate with the management system platform 140 and/or the remote computer system 220 via the same or another wired or wireless communications channel and/or network interface as described herein. Similarly, if an advanced tag 20 is within Bluetooth or LPWAN range of a local sensor and transceiver 34, the local sensor and transceiver 34 can receive data and/or updates from the management system platform 140 and/or the remote computer system 220 and can communicate them to the advanced tag 20 via the corresponding Bluetooth or LPWAN transceivers.

A local sensor and transceiver 34 are suitable in applications where detection of movement by the local sensor prompts the transceiver to power on and receive transmissions from advanced tags 20, basic tags 230, and/or enhanced basic tags 231 within short range communication range and further forward the transmissions to the management system platform 140 and/or remote computer system 220 via long range transmission.

A local lone transceiver 34 (e.g., without a sensor) may be suitable in applications where the transceiver operates on a continuous, pre-scheduled, or instructed basis via the management system platform 140 to receive transmissions from advanced tags 20, basic tags 230, and/or enhanced basic tags 231 within short range communication range and further forward the transmissions to the management system platform 140 and/or remote computer system 220 via long range transmission. In certain embodiments, the local lone transceiver advanced tags, basic tags, and/or enhanced basic tags within short range communication range and further forward the transmissions to the management system platform 140 and/or remote computer system 220 via long range transmission 34, which may also be deemed a "base station," is hardwired for continuous power and/or battery powered. 11

3. Management System Platform.

The management system platform 140 is adapted and configured to provide management of the livestock 12 to which advanced tags 20, basic tags 230, and/or enhanced basic tags 231 are attached and of the various tags themselves. The management system platform 140 is adapted and configured to perform various functions and operations related to management of the livestock 12 individually and as a herd.

The management system platform 140 can comprise and is hosted on one or more computers, such as a desktop PC, workstation, or server at one or more fixed locations, including in the cloud, and/or on one or more mobile computing devices, such as a laptop PC or tablet computer, etc. A number of suitable host platforms are identified and described herein. In addition, all or a portion of the management system platform 140 is duplicated and/or distributed across one or more host platform devices. The management system platform 140 can communicate with the advanced tags 20 and the local sensors and transceivers 34 wirelessly either locally or remotely via cellular, satellite, or IP-based networks, LPWAN, and/or other communications channels as illustrated in FIGS. 4 and 6.

The management system platform 140 is adapted and configured to communicate with the advanced tags 20, with the local sensors and transceivers 34 in the area under management, and with the remote computer system 220. The management system platform 140 can send and receive various information to and from the advanced tags 20, local sensors and transceivers 34, and remote computer system 220 including, but not limited to, data, alerts and alarms, programs, applications, AI models, other detection algorithms, and updates. The management system platform 140 is adapted and configured to receive and store the data generated by each individual advanced tag 20, basic tag 230 and/or enhanced basic tag 231 and local sensor and transceiver 34 and to process and respond to such data to perform the various management functions. The management system platform 140 is also adapted and configured to receive, aggregate, and store the data received from all of the various tags and the local sensors and transceivers 34 and to process, respond to, store, communicate, and provide access to such data to perform the various management functions.

Figure 6:
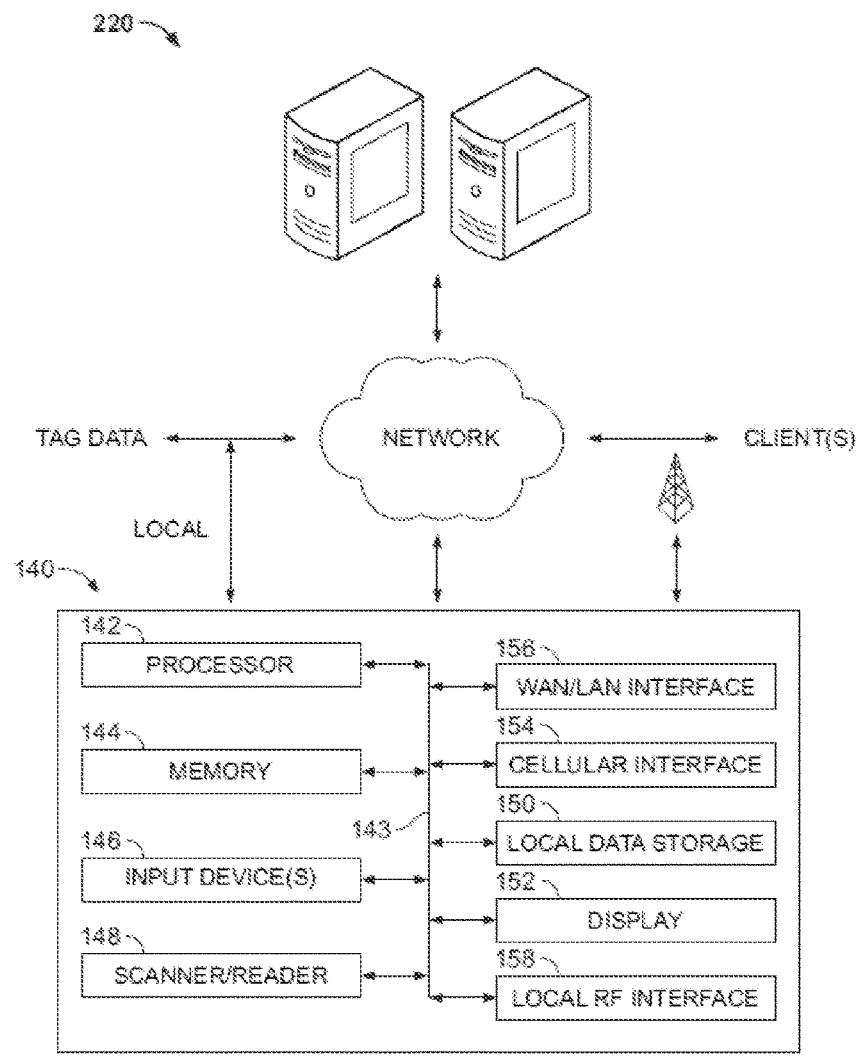
FIG. 6 is a combination block diagram illustrating the elements and architecture of a management system platform of a livestock management system and graphical representation illustrating communications relationships between the management platform 21 and other elements of the system.

As illustrated in FIG. 6, the management system platform 140 can include a processor 142, a memory element 144, one or more input devices 146, a scanner/reader 148, local storage 150, and a display 152. The management system platform 140 can also include a communications interface comprising a cellular network interface 154, a WAN/LAN network interface 156, and a local RF interface 158. The communications interface can also include a satellite network interface and/or an LPWAN interface if desired.

The processor 142 is adapted to execute programs, applications, models, etc. stored in the memory 144 and to process the data received by the management system platform 140 in order to perform the livestock management functions and operations. The processor 142 is configured and programmed to communicate with, to control, and to manage the operation of the various other components and elements of the management system platform 140 identified above and illustrated in FIG. 6. The processor 142 is connected to and communicates with each of the elements and components via a bus 143.

The memory element 144 is adapted to provide local storage for operating and applications data for use in connection with the operation and functioning of the management system platform 140. The input device(s) 146 are adapted and configured to enable a user to interact with the management system platform 140. The user can interact with the management system platform 140 using the input device(s) 146 in many ways including, but not limited to, inputting or entering data, selecting items of data or information presented by the system, selecting programs, applications, models, algorithms, functions, etc. presented by the system to be performed, making requests or giving commands to the system, etc.

The scanner/reader 148 is adapted and configured to scan and/or read data and/or information from an advanced tag 20 when the scanner/reader 148 is in proximity to the advanced tag 20. The scanner/reader 148 can include, but is not limited to, an RFID scanner/reader, a bar code scanner/reader, a QR code scanner/reader, etc. The data and/or information can include any data that is encoded and included on or in a advanced tag 20. Such data and/or information can include, but are not limited to, a unique advanced tag ID, and corresponding data that is specific to the livestock 12 to which the advanced tag 20 is attached or is to be attached, etc. The scanner/reader 148 is incorporated in a mobile element of the management system platform 140 such as a hand-held or other mobile device. Such a device is carried by a rancher, herd manager, etc. and is used to scan and/or read data and/or information from an advanced tag 20 attached to a particular livestock 12 in the field. This can enable a rancher, herd manager, etc. to locate a particular livestock 12, confirm the identity of a particular livestock 12, and/or provide attention to a particular livestock 12 in the field. The scanner/reader 148 also is incorporated in a non-mobile element of the management system platform 140 such as a desktop PC or work station in an office. In that setting, the scanner/reader 148 is used to enter new advanced tags 20 into the management system that are to be attached to new livestock 12, e.g., recently born or recently acquired livestock 12 that are to be added to the herd under management.

The local storage 150 is adapted and configured to provide storage for the data and information received from the advanced tags 20, from local sensors and transceivers 34, and from the remote computer system 220, and from other external sources, e.g., banks, veterinarians, markets, other ranches, etc. The local storage 150 is also adapted and configured to provide storage for data and information generated by the management system platform 140 and/or the remote computer system 220.

The display 152 is adapted and configured to visually present data and/or information for a user of the management system platform 140. Such data and/or information can include, but is not limited to, data or information entered by the user, data or information received from one or more advanced tags 20, basic tags 230, and/or enhanced basic tags 231 and/or local sensors and transceivers 34, data or information received from other external sources, data or information generated by the management system platform 140, representations of data, information, programs, applications, models, functions, etc. for selection by a user, and representations of user-selectable menus and menu items.

The management system platform 140 is adapted and configured to communicate with the advanced tags 20, basic tags 230, and enhanced basic tags 231, the local sensors and transceivers 34, and the remote computer system 220 via the communications interface. The communications interface provides interfaces to a number of different communication channels over which the management system platform 140 can communicate.

The cellular network interface 154 provides one communications channel over which the management system platform 140 can communicate remotely with the advanced tags 20, the local sensors and transceivers 34, and the remote computer system 220. The cellular network interface 154 includes a cellular network transceiver that is operative to wirelessly transmit and receive data to and from corresponding cellular transceivers 86 of the advanced tags 20, the local sensors and transceivers 34, and the remote computer system 220 via one or more cellular networks. The cellular network transceiver of the management system platform 140 is the same as or similar to the cellular network transceivers 86 of the advanced tags 20 and the local sensors and transceivers 34.

The cellular network transceiver of the management system platform 140 communicates data with one or more cell towers within cellular signal range. The cell towers communicate data in both directions between the management system platform 140, the individual advanced tags 20 and local sensors and transceivers 34, and the remote computer system 220.

The WAN/LAN network interface 156 provides another communications channel 7 over which the management system platform 140 can communicate data remotely or locally with the advanced tags 20, basic tags 230, and/or enhanced basic tags 231, with the local sensors and transceivers 34, and with the remote computer system 220. The WAN/LAN network interface 156 can include an LPWAN network transceiver that is operative to wirelessly transmit and receive data remotely to and from the corresponding LPWAN network transceivers 88 of the advanced tags 20, basic tags 230, and/or enhanced basic tags 231, and the local sensors and transceivers 34 including via one or more intermediate WAN and/or LAN networks. The LPWAN transceiver of the management system platform 140 is the same as or similar to the LPWAN network transceivers 88 of the advanced tags 20 and the local sensors and transceivers 34.

The WAN/LAN network interface 156 can also include a conventional TCP/IP and/or HTTP type network interface that is operative to communicate data either remotely or locally with the advanced tags 20, basic tags 230, and/or enhanced basic tags 231, with the local sensors and transceivers 34, and with the remote computer system 220 at least when certain conditions are present. For example, the management system platform 140 can communicate data with advanced tags 20, basic tags 230, and/or enhanced basic tags 231, local sensors and transceivers 34, and the remote computer system 220 remotely via a WAN, e.g., the Internet, provided they have an Internet connection available.

The local RF interface 158 provides another communications channel over which the management system platform 140 can wirelessly communicate data locally with the advanced tags 20, basic tags 230, and/or enhanced basic tags 231, and with the local sensors and transceivers 34 when the management system platform 140 is in relatively close proximity to an advanced tag 20, basic tags 230, and/or enhanced basic tags 231, or a local sensor and transceiver 34. The local RF interface 158 can include a Bluetooth transceiver and/or an RFID transceiver for that purpose. The Bluetooth and/or RFID transceivers of the management system platform 140 is the same as or similar to the corresponding Bluetooth and/or RFID transceivers 84, 92 of the advanced tags 20, basic tags 230, and/or enhanced basic tags 231, and the local sensors and transceivers 34.

Similar to the advanced tags 20 as described above, the management system platform can first try to communicate with the advanced tags 20, basic tags 230, and/or enhanced basic tags 231, and/or the remote computer system 220 via a local communications channel such as the Bluetooth transceiver 84 or the LPWAN transceiver 88 if it is within signal range of corresponding transceivers of the advanced tag 20, basic tags 230, and/or enhanced basic tags 231, and/or local sensors and transceivers 34.

Similarly, the management system platform 140 can first try to communicate with the remote computer system 220 over the TCP/IP-HTTP type network interface of the WAN/LAN network interface 156. This communication channel provides greater bandwidth and data rates and is less costly than a long-range wireless communications channel such as cellular or satellite. The TCP/IP-HTTP type network interface can provide wired and/or wireless communications over a long-range via a WAN such as the Internet and/or over a short range via a LAN. However, if a WAN and/or LAN connection is not available for some reason, then the management system platform 140 has the option to communicate with the remote computer system 220 over a long-range wireless communications channel such as a cellular network via the cellular network transceiver 154 of the WAN/LAN network interface 156 or a satellite data network via a satellite data network transceiver albeit at lower bandwidth and data rate.

The management system platform 140 can also communicate data remotely with clients over a WAN/LAN network communications channel via the WAN/LAN network interface 156, a cellular communications channel via the cellular network interface 154, or a satellite communications channel via a satellite data network interface.

4. Remote Computer System.

The remote computer system 220 may be comprised of any computing and/or storage site capable of communicating (e.g., receiving and/or transmitting), processing, and/or storing data. The remote computer system 220 may be comprised of one or more server computers, cloud based computers, mainframe computers, personal computers, virtual computers, or other computer systems. The remote computer system 220 may be capable of communicating data and information via one or more of the IP and/or telecommunication networks identified herein. As is appreciated, one or more modems, transceivers, or other communication devices, including devices similar to those described in the sections herein with respect to the advanced tags 20, basic tags 230 and/or enhanced basic tags 231 and the management system platform 140, may be required between the remote computer system 220, the management system platform 140, and the advanced tags 20 for such communication.

The remote computer system 220 can and preferably does also include one or more displays (e.g., screens or monitors), one or more fixed or portable hard disk drives or solid state drives, one or more communications interfaces (e.g., network or telecommunications), and one or more keyboards. The remote computer system 220 may also include an integral or separate portable printer and/or scanner.

The remote computer system 220 will include one or more central processing units (CPU's), such as one or more microprocessors, a memory bus, random access memory (RAM), read only memory (ROM), a peripheral bus, and a keyboard controller. The buses may be integrated as a single bus or may be separate buses. The central processing unit is a general-purpose digital processor that controls the operation of the computer. The central processing unit is a single-chip processor or implemented with multiple components. Using instructions retrieved from memory, the central processing unit controls the reception and manipulations of input data and the output and display of data on output devices. The memory bus is utilized by the central processing unit to access the RAM and the ROM. RAM is used by central processing unit as a general storage area and as scratch-pad memory, and can also be used to store input data and processed data. ROM is used to store instructions or program code for execution by the central processing unit as well as other data intended to be maintained permanently or semi-permanently. The peripheral bus is used to access the input, output and storage devices used by the remote computer system 220. In the described embodiments, these devices can include one or more displays (e.g., screen or monitor), printer devices, hard disk drives or solid state drives, and communications interfaces (e.g., IP network, cellular network, LPWAN). A keyboard controller is used to receive input from the keyboard and send decoded symbols for each pressed key to the central processing unit over a bus. The keyboard is used by a user to input commands and other instructions to the remote computer system 220. The remote computer system 220 can also include other types of user input devices. For example, pointing devices such as a computer mouse, a track ball, a stylus, or a tablet are operable by a user to manipulate a pointer on a display of the remote computer system 220 to make user selections. The display is an output device that displays images of data provided by the central processing unit via the peripheral bus or provided by other components in the remote computer system 220. The display can also be an input device such as a touch sensitive screen that receives selection information from a user and communicates it to the central processing unit. The printer device when operating as a printer provides an image on a sheet of paper or a surface of another non-transient medium. The one or more hard disk drives and/or solid state drives is utilized to store various types of data including the masses of data and determinations generated and communicated by the advanced tags 20, basic tags 230, and/or enhanced basic tags 231, the local sensors and/or transceivers 34, and the management system platform 140. The central processing unit, together with an operating system, operates to execute computer code and to produce and use data. The computer code and data may reside on RAM, ROM, or hard disk drive or solid state drive. The computer code and data can also reside on a removable and/or portable program medium and is loaded or installed onto the remote computer system 220 when needed. Removable program mediums include, for example, CD-ROM, PC-CARD, USB drives, floppy disk and magnetic tape.

The communications interfaces are utilized to send and receive data over one or more networks that is connected to other devices and/or computer systems, e.g., the advanced tags 20, basic tags 230, and/or enhanced basic tags 231, local sensors and transceivers 34, and the management system platform 140. The communications interfaces can include an interface card or similar device and appropriate software implemented by the central processing unit or a separate communications processor to connect the remote computer system 220 to an existing network and transfer data according to standard data communication and network protocols.

The remote computer system 220 is a separate computer system or is a part of the management system platform 140. The remote computer system 220 can also be located in whole or in part in the same location as or in relative proximity to the management system platform 140, and is located in whole or in part at a location relatively distant from the management system platform 140. For example, to the extent it is not incorporated as part of the management system platform 140, the remote computer system 220 is located in the same room or a room adjacent to the management system platform and is connected to the management system platform 140 via a LAN network connection as described herein. Alternatively, the remote computer system 220 is located in a location many yards or miles away from the management system platform 140 and the advanced tags 20 and is connected to the management system platform 140 and the advanced tags 20 via a WAN, cellular, satellite, LPWAN, and/or other communications connection as described herein. Accordingly, "remote" in connection with the remote computer system is meant to distinguish it and its functionality from the management system platform 140 at least to the extent it is not incorporated as part of the management system platform 140, and is not necessarily meant to refer to its physical distance from the management system platform 140.

The remote computer system 220 preferably is capable of receiving, storing, and processing any and all of the masses of aggregated data received and acquired by the plurality of advanced tags 20, basic tags 230, and/or enhanced basic tags 231 attached to a plurality of livestock 12 under management. Such data can include, but is not limited to, location, orientation, movement over ground, heading, elevation, heart rate, blood oximetry, and internal body temperature of the livestock 12, the position and angle of the livestock 12 relative to other nearby livestock 12, and any other livestock-related data described herein. The remote computer system 220 preferably is also capable of receiving, storing and processing any and all of the masses of aggregated determinations of livestock activity, behavior, health-related and other physical conditions made by the advanced tags 20, basic tags 230, and/or enhanced basic tags 231, Such determinations can include, but are not limited to, eating, drinking, ruminating, resting, ambulating, estrus, jumping, standing to be mounted, mounting, ovulating, breeding, pregnancy, calving, illness, injury, various external events and conditions, and any other determinations described herein. In addition, the remote computer system 220 is preferably capable of receiving, storing, and processing the aggregated data and determinations not only from advanced tags 20 attached to the livestock 12 of one herd under management, but also of advanced tags 20, basic tags 230, and/or enhanced basic tags 231, attached to the livestock 12 of a plurality of different herds under management at the same or different locations and by the same or different ranchers, herd managers, owners, etc.

The remote computer system 220 preferably includes suitable machine learning, AI model(s), and/or other detection algorithm(s) creation and development tools to create, develop, train, and update one or more AI models and/or other detection algorithms using the stored masses of aggregated data and determinations received from all of the various tags. Various programs, applications, coding, and other tools are known for this purpose. Preferably, the remote computer system 220 is capable of and is used to create, develop, train, and update one or more machine learning and/or AI models and/or other detection algorithms to predict and/or determine an activity of a livestock 12 from selected data about the livestock 12. As one example, one or more models or detection algorithms is created to predict and/or determine from data including location, orientation, elevation, and movement data that the livestock 12 is eating, drinking, ruminating, resting, or ambulating. Similarly, the remote computer system 220 is preferably capable of and is used to create, develop, train, and update one or more machine learning, AI models, and/or other detection algorithms to predict and/or determine a health related or other physical condition of a livestock 12 from selected data and selected determinations of activity about the livestock 12. As one example, one or more models or other detection algorithms is created to predict and/or determine from selected data (e.g., internal body temperature over time, weight, heart rate, blood oximetry, location, relative position and angle to nearby herd members, orientation, elevation, and movement) and from selected activity determinations (e.g., eating, drinking, ambulation) that the livestock 12 is ill, injured, in estrus, standing to be mounted, mounting, ovulating, breeding, pregnant, or calving.

Once one or more models and/or other detection algorithms are created, developed, and trained at and by the remote computer system 220, and is communicated to each of the advanced tags 20 either directly or via the management system platform 140, embedded in the advanced tags 20, and applied to data and determinations during operation of the advanced tags 20 in the manner described in the sections above; basic tags 230 and/or enhanced basic tags 231 (or other short range communication devices) can be updated to receive algorithms as well. As the advanced tags 20 receive and acquire additional data and make additional determinations using the models and/or other detection algorithms, the additional data and determinations is communicated to the remote computer system 220 either directly or via the management system platform 140 as described in the sections above. Known machine learning, modeling, and/or other tools is applied at the remote computer system 220 to the historical and new additional data and determinations to create new models or other detection algorithms and/or to update existing models and/or other detection algorithms. For example, the values of certain weighting or other parameters of an existing model and/or other detection algorithm is adjusted to provide predictions and/or determinations that are more statistically accurate based on the existing and added data. The new and/or updated models and/or other detection algorithms and/or parameters are then communicated to the advanced tags 20, basic tags 230 and/or enhanced basic tags 231 as described herein to supplement, replace, or update the existing models and/or other detection algorithms embedded therein. In this way, the predictions and determinations made by the advanced tags 20, basic tags 230, and/or enhanced basic tags 231 are more accurate over time.

5. Exemplary Telecommunications Networks.

In addition to the various communications channels and networks identified above in connection with the livestock management system 10, the livestock management system may be utilized upon any telecommunications network capable of transmitting data including voice data and other types of electronic data. Examples of suitable telecommunications networks for the livestock management system 10 include but are not limited to global computer networks (e.g. Internet), wireless networks, cellular networks, satellite communications networks, cable communication networks (via a cable modem), microwave communications network, local area networks (LAN), wide area networks (WAN), low power wide area networks (LPWAN), campus area networks (CAN), metropolitan-area networks (MAN), and home area networks (HAN). The livestock management system 10 may communicate via a single telecommunications network or multiple telecommunications networks concurrently. Various protocols may be utilized by the electronic devices for communications such as but not limited to HTTP, SMTP, FTP and WAP (wireless Application Protocol). The livestock management system 10 may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The livestock management system 10 may also be utilized with online services and internet service providers.

The Internet is an exemplary telecommunications network for the livestock management system 10. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

6. Mobile Devices.

As described above, all or a portion of the management system platform 140 is hosted on one or more mobile devices. The mobile devices may be comprised of any type of computer for practicing the various aspects of the livestock management system 10. For example, in addition to the types of mobile devices described in the sections above, the mobile devices may be comprised of any conventional computer system provided it is portable. Also, for example, the mobile devices are portable personal computers (e.g. APPLE® based computer, an IBM based computer, or compatible thereof) or tablet computers (e.g. IPAD®). The mobile devices may also be comprised of various other electronic devices capable of sending, receiving, and processing electronic data including but not limited to smart phones, mobile phones, personal digital assistants (PDAs), mobile electronic devices, handheld wireless devices, two-way radios, communicators, video viewing units, portable television units, portable television receivers, portable cable television receivers, pagers, communication devices, and digital satellite receiver units. In certain embodiments, the mobile device includes a global navigation satellite system (GNSS) similar to GNSS 82 enabling the mobile device to generate a GPS location, which can be transmitted, via long range communication, by a transceiver within the mobile device.

7. Basic Tags.

The livestock management system 10 not only utilizes a plurality of advanced tags (e.g., a first type of livestock tag) to monitor and manage a livestock herd but additionally includes a plurality of basic tags 230 and/or enhanced basic tags 231 (e.g., a second type of livestock tag) that communicate with the management system platform via 140 via one or more advanced tags 20. Both the basic tag 230 and enhanced basic tag 231 transmit their unique tag identifier to the management system platform 140 and/or remote computer 220 by short-range wireless transmissions to the one or more advanced tags 20 (and/or to one or more local sensor and/or transceivers 34 and/or to one or mobile devices), subsequently, from the one or more advanced tags 20 (and/or from the one or more local sensors and/or transceivers 34 and/or from one or more mobile devices) by long-range wireless transmissions to the management system platform 140 and/or remote computer 220. The enhanced basic tag 231 additionally generates and transmits IMU data that may be similarly wirelessly transmitted by one or more advanced tags 20 to the management system platform 140 and/or remote computer 220. In certain embodiments, the enhanced basic tag 231 may additionally or alternatively transmit the unique tag identifier via radio frequency to an RFID scanner/reader.

Figure 7A:
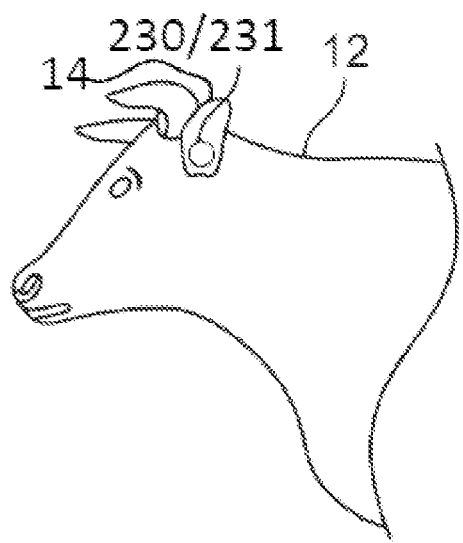
FIG. 7A is a perspective view of a graphical representation of a livestock fitted with basic tag or enhanced basic tag component of a livestock management system.
Figure 7B:
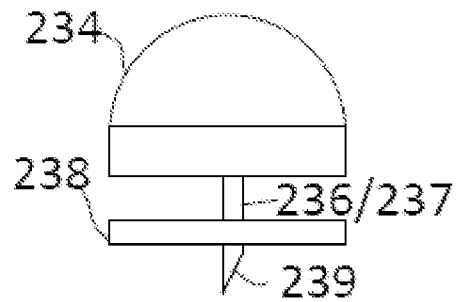
FIG. 7B is a side view of a graphical representation of a livestock fitted with basic tag or enhanced basic tag component of a livestock management.
Figure 8:
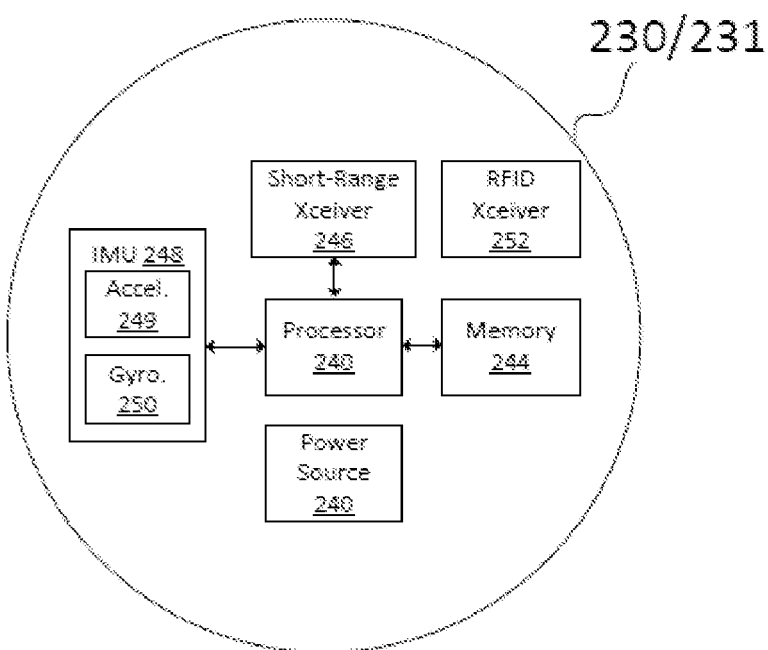
FIG. 8 is a block diagram illustrating the elements and architecture of basic tag and enhanced basic tag component of a livestock management system.

Each basic tag 230 or enhanced basic tag 231 is preferably adapted to be physically attached to an external body part of an individual livestock in a location where the basic tag 230 or enhanced basic tag 231 will be both readily visible and readily physically accessible. For example, as illustrated in FIGS. 7A-7B, the basic tag 230 or enhanced basic tag 231 may be attached to the outer ear or auricle 14 of the livestock 12. Each basic tag 230 or enhanced basic tag 231 has indicia or markings allowing it to be readily and uniquely identified visually even when attached to a livestock 12.

Each basic tag 230 and enhanced basic tag 231 is self-powered and includes at least processing, storage and communication components to receive, retain and communicate identification data regarding the individual livestock 12 to which it is attached. The enhanced basic tag 231 additionally includes a livestock data generation and collection component and/or a back-up communication component. The data generated and collected can include, but is not limited to, livestock location, movement, orientation, position relative to other livestock, physical parameters, etc.

Unlike the advanced tag 20, the basic tag 230 is not designed to locally process data but rather is designed with a purpose of short-range wireless transmission of a unique tag identifier associated with the livestock 12, via one or more advanced tags 20, to the management system platform 140 and/or remote computer 220. In forwarding the unique tag identifier of the basic tag 230 to the management system platform 140 and/or remote computer 220 via long-range wireless transmission, the one or more advanced tags 20 can additionally include in the transmission its own respective unique identifier and/or a location of the one or more advanced tags 20, as generated by the GNSS receiver 82 of the one or more advanced tags 20. The unique tag identifier and/or the location of the one or more advanced tags 20 is associated with the unique tag identifier of the basic tag 230 by the management system platform providing insight to the location of the basic tag 230 (e.g., within a predetermined distance (such as signal range) of the one or more advanced tags 20).

Each enhanced basic tag 231, having all the functionality of the basic tag 230, is additionally configured and adapted to generate and operate on data regarding physical parameters and/or activity of the livestock to which the enhanced basic tag 231 is attached. The enhanced basic tag 231 then transmits this data via short-range communication to one or more advanced tags 20, which subsequently transmits the data via long-range communication to the management system platform 140 and/or remote computer 220. Alternatively, the enhanced basic tag 231 is configured and adapted to generate data regarding the physical parameters and activity of the livestock 12 then transmit this data without operating upon the data, via short-range communication, to one or more advanced tags 20 where the data may be operated upon. In another alternative, the data received at the one or more advanced tags 20, is transmitted onward, without operation there upon, via long-range communication to the management system platform 140 and/or remote computer 220 where the data is finally operated upon.

Each basic tag 230 is designed to be lightweight, small, and inexpensive. As such, each basic tag 230 includes minimal electronics to enable the basic tag 230 to transmit, via short-range wireless transmission, a unique tag identifier, which is associated with the livestock 12 to which the basic tag 230 is attached, to another nearby device. The transmitted unique tag identifier may be the same or different from the visible identifier on the enclosure 234 of the basic tag 230. In certain embodiments, the basic tag 230 is designed to only transmit the unique tag identifier. In certain embodiments, the basic tag 230 may receive a unique tag identifier transmitted from another basic tag 230 and/or enhanced basic tag 231 associated with another nearby livestock 12 and transmit both its own unique tag identifier and the unique tag identifier from the nearby livestock 12. In certain embodiments, the basic tag 230 receives software updates.

The nearby device to which the unique tag identifier of the basic tag 230 (or enhanced basic tag 231) may be transmitted includes, but is not limited to, another basic tag 230 or enhanced basic tag 231, an advanced tag 20, a plurality of local sensors and transceivers 34, a computing device, and/or any device equipped with a receiver or transceiver that is capable of short-range communication with the basic tag 230.

The elements included in the basic tag 230 include a power source 240, a processor 242, a memory 244, and a short-range wireless local area network (WLAN) transceiver 34. Each of the power source 240, the processor 242, memory 244 and short-range WLAN 14 transceiver 246 are housed within the enclosure 234 of the basic tag 230.

The power source 240 supplies the electrical operating power (DC current and voltage) to the various elements of the basic tag 230 at required levels. Preferably the various elements consume as little power as possible in operation, preferably less than a few milliwatts on average. The power source 240 is preferably a non-rechargeable battery that is equipped with sufficient battery life to power the elements of the basic tag 230 for the 18-24 month life of a slaughter animal without having to be replaced. Alternatively, a rechargeable battery such as that utilized in the advanced tag 20 may be used as the power source 240 or any other suitable power source may be used.

The processor 242 is any circuit configured to process information and can include any suitable analog or digital circuit. The processor 242 can also include a programmable circuit that executes instructions for performance of the functions and operations of the basic tag 230 described herein. Examples of programmable circuits include a microprocessor, a microcontroller, an application specific integrated circuit (ASIC), a programmable gate array (PLA), a field programmable gate array (FPGA), or any other processor or hardware suitable for executing instructions that are stored in memory 244. In a preferred embodiment, the processor 242 is a low power consumption processor selected to accommodate the limited power that is provided by the power source 240. The processor 242 is configured and programmed to communicate with, to control, and to manage the operation of the various other elements of the basic tag 230.

The memory 244, which is unitary and/or distinct from the processor 242, can include volatile memory such as random access memory (RAM) and non-volatile memory such as read only memory (ROM), electrically erasable programmable read only memory (EEPROM), flash memory, non-volatile random access memory (NVRAM), magnetic memory, optical memory, or another suitable memory technology. Items stored in memory 244 can include the unique tag identifier of the basic tag 230 as well as code providing executable instructions to the processor 242 for performance of the functions and operations of the basic tag 230 (or enhanced basic tag 231) described herein.

The short-range WLAN transceiver 246 can comprise, for example, a Bluetooth transceiver or other short-range communication protocol transceiver including a short-range communication protocol transceiver capable of communicating according to an independently developed proprietary communication protocol that is specific to the basic tag 230 (and/or the enhanced basic tag 231) or specific to the livestock inventory system within which the basic tag 230 operates. The short-range WLAN transceiver 246 is operative to transmit and receive data wirelessly with other nearby short-range transceivers that are operating under a common communication protocol and are within a predetermined signal range. In a preferred embodiment, the short-range WLAN transceiver 246 comprises a low power consumption transceiver so as to draw minimal power from the power source 240. The short-range WLAN transceiver 246 may also be found, for example, in the advanced tag 20, in one or more sensors attached to the livestock 12, in one or more local sensors placed in various locations where the livestock 12 may pass or reside, a computing device, and/or any other device equipped with a receiver or transceiver that is capable of short-range communication with the basic tag 230.

The short-range WLAN transceivers 246 also may be embedded in one or more gateways or hubs, such as hubs, 85 that may be located in one or more areas or locations of a property under management where livestock 12 may be present. The gateways or hubs may in turn may have one or more wireless and/or wired connections to one or more other data networks to which the management system platform 140 and/or the remote computer system 220 are connected. Such other networks may include, for example, a TCP/IP-based LAN or an HTTP-based WAN such as the Internet. The gateways or hubs thus provide nearby basic tags 230 and/or enhanced basic tags 231 that are within signal range with at least one longer range communication channel for the basic tags 230 and/or enhanced basic tags 231 to wirelessly and directly communicate with the management system platform 140 and/or the remote computer system 220. One or more gateways or hubs also may be adapted and configured to function as repeaters. In that case, advanced tags 20, basic tags 230 and/or enhanced basic tags 231 that are not in signal range of each other can still communicate with each other wirelessly.

The advanced tag 20, basic tag 230 and/or enhanced basic tag 231 can be configured to transmit, via short range communication, their unique tag identifier on a continuous basis, on a pre-determined interval basis, and/or can be woken to transmit their unique tag identified upon being within short range communication of an advanced tag 20, a local sensor and/or transceiver 34, and/or mobile device. 23

8. Enhanced Basic Tags.

The enhanced basic tag 231 includes all elements of the basic tag 230 along with one or both of an inertial measurement unit (IMU) 248 and a radio frequency identification (RFID) transceiver 250. When utilized, the IMU 248 and/or the RFID transceiver 250 are housed within the enclosure 234 of the enhanced basic tag 231, are powered as needed by the power source 240, and are in communication with the processor 242 as needed.

The advanced tags 20, as well as the basic tags 230 and/or enhanced basic tags 231, 2 are adapted and configured so that when they are attached to livestock 12 they can communicate with other nearby advanced tags 20, nearby basic tags 230 and/or enhanced basic tags 231, and nearby local sensors and transceivers 34 to autonomously and automatically organize into one or more dynamic local mesh networks. Depending on the relative locations of the individual livestock 12 of a herd under management at any given time, one or more dynamic local mesh networks may be formed and exist. In addition, as the livestock 12 move and change location relative to each other, the nodes or members, e.g., advanced tags 20, basic tags 230 and/or enhanced basic tags 231 and respective livestock 12, of various dynamic local mesh networks may dynamically and automatically change as well as the locations of the networks themselves.

In certain embodiments, the advanced tags 20, basic tags 230, and/or enhanced basic tags 231 is adapted and configured to only form a dynamic mesh network with nearby advanced tags 20, basic tags 230, and/or enhanced basic tags 231 meeting predetermined criteria, for example those within a predetermined distance and/or with signal levels above a predetermined value. The advanced tags 20, basic tags 230, and/or enhanced basic tags 231 also is adapted and configured to limit the number of advanced tags 20, basic tags 230 and/or enhanced basic tags 231 with which they form a local mesh network to a maximum number, for example a predetermined number of tags with the highest signal levels or the closest proximity.

The basic tags 230 and the enhanced basic tags 231 are of a simplified design capable of working with the advanced tags 20 within the context of the management system platform 140 and/or remote computer system 220 to provide a lower cost option for monitoring a livestock herd. For example, instead of tagging each livestock 12 with a costly advanced tag 20, at least a portion of the livestock herd is tagged with a basic tag 230 or enhanced tag 231. Each basic tag 230 and enhanced basic tag 231 can communicate via short range communication (e.g., Bluetooth) with the advanced tags 20 and utilize the advanced functionality of the advanced tags 20 including, but not limited to, IMU data processing as well as long-range wireless communication, for transfer of data to the management system platform 140 and/or remote computer 220. Each basic tag 230 and enhanced basic tag 231 can utilize short range communication for communicating not only with advanced tags 20 but also with local sensors and transceivers 34, and remote computing devices within short range communication range.

As such, the main function of each of the basic tags 230 and enhanced basic tags 231 is to transmit their respective unique tag identifier, which is stored in memory 244, through their respective short-range WLAN transceiver to the short-ranged transceiver, e.g., Bluetooth transceiver 84, of one or more advanced tags 20, one or more local sensors and transceivers 34, and/or remote computing devices within range.

C. Operation of Preferred Embodiment

The livestock location tracking procedure according to the present disclosure is typically used to track a livestock 12 that has been deemed a slaughter animal having a lifespan of 18-24 months prior to slaughter and that has been tagged with a basic tag 230 or enhanced basic tag 231. The slaughter livestock 12 is typically tagged with the less expensive basic tag 230 or enhanced basic tag 231 while livestock 12 that is intended to be retained for continued use is typically tagged with the more expensive advanced tag 20. However, it should be noted that any livestock 12 can be tagged with any of the advanced tag 20, basic tag 230, or enhanced basic tag 231 and it should further be noted that livestock location tracking procedure can be performed for any livestock 12 that is tagged with an advanced tag 20, basic tag 230 and/or enhanced basic tag 231 in a manner similar to the procedure described herein.

Figure 9:
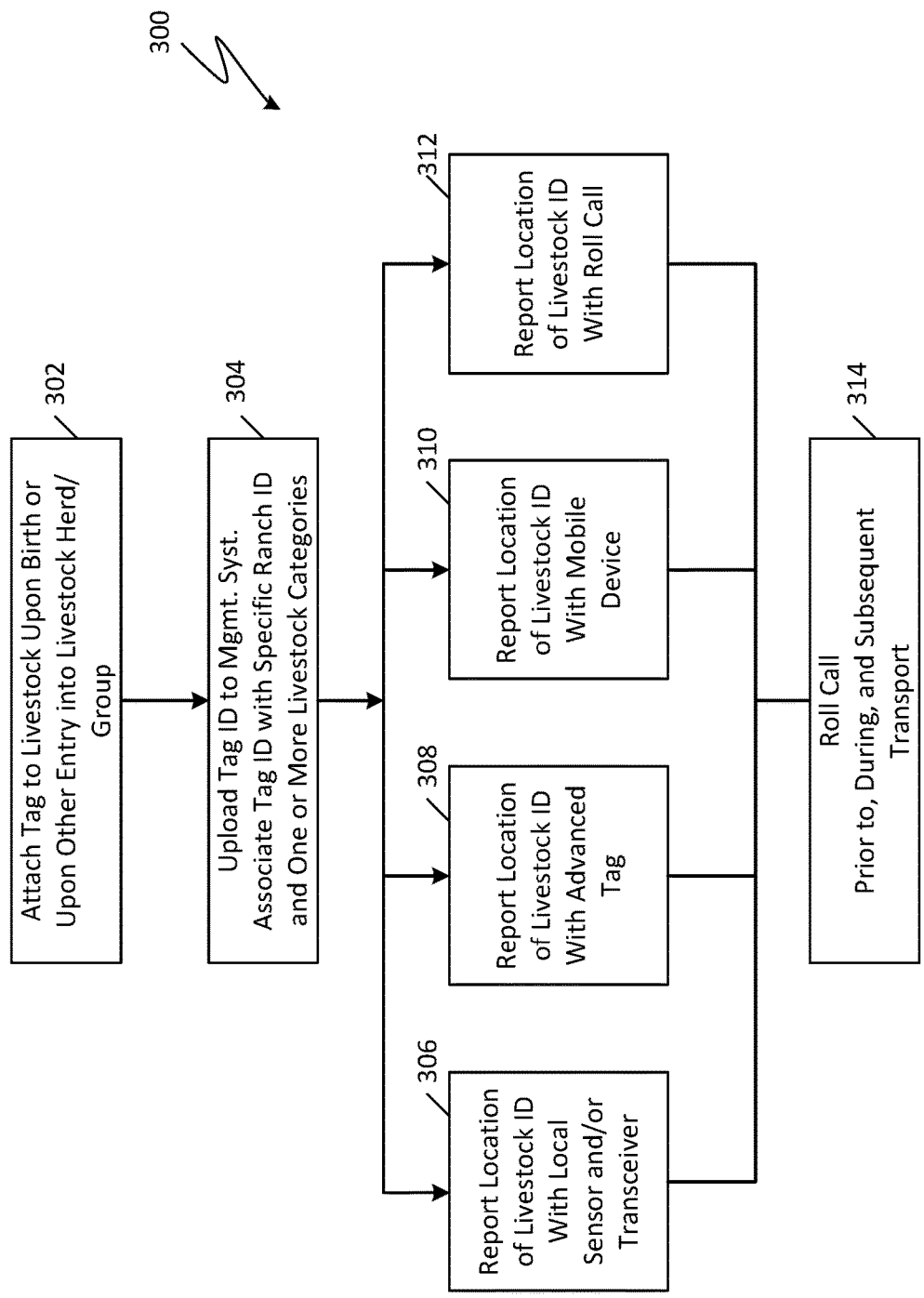
FIG. 9 is a flowchart illustrating a livestock location tracking procedure according to the present disclosure.

The livestock location tracking procedure 300 of the present disclosure is described with reference to the flowcharts of FIGS. 9 and 10, and is implemented through the use of the livestock management system 10 and the associated local sensors and transceivers 34, advanced tags 20, basic tags 230 and/or enhanced basic tags 231.

As shown, the livestock location tracking procedure 300 begins with attaching a basic tag 230 or enhanced basic tag 231 to a newly born slaughter livestock 12 (or to any new livestock animal that is otherwise added to the livestock group/herd), per block 302. The unique tag identifier associated with the basic tag 230 or enhanced basic tag 231, if not previously entered within the livestock management system 10, is uploaded to the livestock management system 10 for tracking along with an initial location of the new livestock 12, per block 304.

The unique tag identifier of the basic tag 230 or enhanced tag 231 is transmitted via short range communication to a nearby mobile device or other nearby smart device, a nearby advanced tag 20, and/or a nearby local sensor and/or transceiver 34 which subsequently transmits, via long range communication, the unique tag identifier of the basic tag 230 and/or enhanced basic tag 231 to the livestock management system 10.

In certain embodiments, within the livestock management system 10, the stored unique tag identifier of the basic tag 230 or enhanced basic 231 can be associated with one or more group livestock names, e.g., a herd name, a ranch name, a farm name, etc., and the stored unique tag identifier can additionally be associated with one or more livestock categories, e.g., male calves, female calves, vaccinated cows, sick livestock, etc. Associating other parameters or features of interest with the stored unique tag identifier can also be performed within the livestock management system 10.

The initial location of the new livestock 12 is generated by and transmitted along with the unique tag identifier, via long range communication, by a nearby mobile device or other smart device having a global navigation satellite system (GNSS), and/or a nearby advanced tag 20. Alternatively, a nearby local sensor and/or transceiver 34 with can transmit the unique tag identifier and its location can be assigned as the initial location of the new livestock 12.

Subsequently, the location of the new livestock 12 can be tracked throughout its lifetime, which in the instance of a slaughter livestock is typically 18-24 months, as it moves through various locations previously associated with the livestock management system 10.

For example, per block 306, local sensors and/or transceivers 34, which are typically positioned at highly trafficked areas (e.g., a water tank, mineral provision areas, food provision areas, fences, chutes, etc.) receives, via short range communication (e.g., Bluetooth), the unique tag identifier from the basic tag 230 or enhanced basic tag 231, and subsequently transmits the unique tag identifier along with a location of the local sensor and/or transceiver 34 (as well as a date and/or time of reception of the unique tag identifier at the local sensor and/or transceiver 34), via long range communication, to the livestock management system 10; any data may additionally be stored at the local sensor and/or transceiver 34. The livestock management system 10 saves the location transmitted from the sensor and/or transceiver 34 and in association with unique tag identifier (e.g., the location of the local sensor and/or transceiver 34 is saved as the location of the basic tag 230 or enhanced basic tag 231), and further saves the date of reception of the unique tag identifier at the local sensor and/or transceiver 34 in association with the unique tag identifier and location within the livestock management system 10. In certain embodiments, the livestock management system 10 can be used to issue an alert that special consideration should be given a specific livestock 12 if the specific livestock 12 has not passed one or more local sensors and/or transceivers 34 within a predetermined amount of time.

In another example, the location of the new livestock 12 can be tracked throughout its lifetime by one or more advanced tags 20 attached to a livestock 12 of the livestock management system 10, per block 308. When the basic tag 230 or enhanced basic tag 231 of the new livestock 12 is within short range communication range of one or more advanced tags 20, the one or more advanced tags 20 receive a short range transmission from the basic tag 230 or enhanced basic tag 231 of their unique tag identifier, which the advanced tag 20 subsequently transmits, via long range communication, along with a location generated by the GNSS 82 of the advanced tag 20 and a date of reception of the unique tag identifier at the advanced tag 20, to the livestock management system 10; any data may also be stored on the advanced tag 20. The livestock management system 10 saves the location transmitted from the advanced tag 20 in association with unique tag identifier (e.g., the location of the advanced tag 20 is saved as the location of the basic tag 230 or enhanced basic tag 231) and further saves the date of reception of the unique tag identifier at the advanced tag 20 in association with the unique tag identifier and location within the livestock management system 10.

In still another example, the location of the new livestock 12 can be tracked throughout its lifetime by a mobile device, per block 310. A mobile device being transported through any environment in which the new livestock 12 may be present can receive a short range communication from the basic tag 230 or enhanced basic tag 231 containing its unique tag identifier. The mobile device having received the short range communication subsequently transmits the unique tag identifier, via long range communication, along with a location of the mobile device and a date of reception of the unique tag identifier at the mobile device, to the livestock management system 10; any data can additionally be stored at the mobile device. The livestock management system 10 then saves the location of the mobile device in association with the unique tag identifier (e.g., the location of the mobile device is saved as the location of the basic tag 230 or enhanced basic tag 231), and further saves the date of reception of the unique tag identifier at the mobile device in association with the location and the unique tag identifier of the basic tag 230 and/or enhanced basic tag 231.

A roll call feature coded within the livestock management system 10 and/or mobile device can also be used to track the location of the new livestock 12 throughout their lifetime, per block 312. The roll call feature is most suitably found being executed on a mobile device having an application in communication with the livestock management system 10 installed thereon. Activation/deactivation of the application's roll call feature can be requested via a user interface of the mobile device and can run in the forefront of the application enabling a user to view of the results of a roll call or can run in background of the application while other features of the application relative to the livestock management system 10 are being executed. The roll call feature can be utilized at any time but is best used when a plurality of livestock 12 are within a confined space, such as a pen or transport vehicle, such that the unique tag identifiers of the nearby one or more basic tags 230, enhanced basic tags 231, and/or advanced tags 20 can be transmitted by short range transmission (e.g., Bluetooth) to a mobile device. In certain embodiments, long range transmissions alone or in combination with short range transmissions, can be used to obtain unique tag identifiers of basic tags 230 and/or enhanced basic tags 231 that are outside of a short range transmission range (e.g., typically 50 to 100 feet for Bluetooth and up to 400 feet with new Bluetooth technology) through use of local sensors and transceivers 34, and/or advanced livestock tags 20 as described with reference to FIG. 9.

Figure 10:
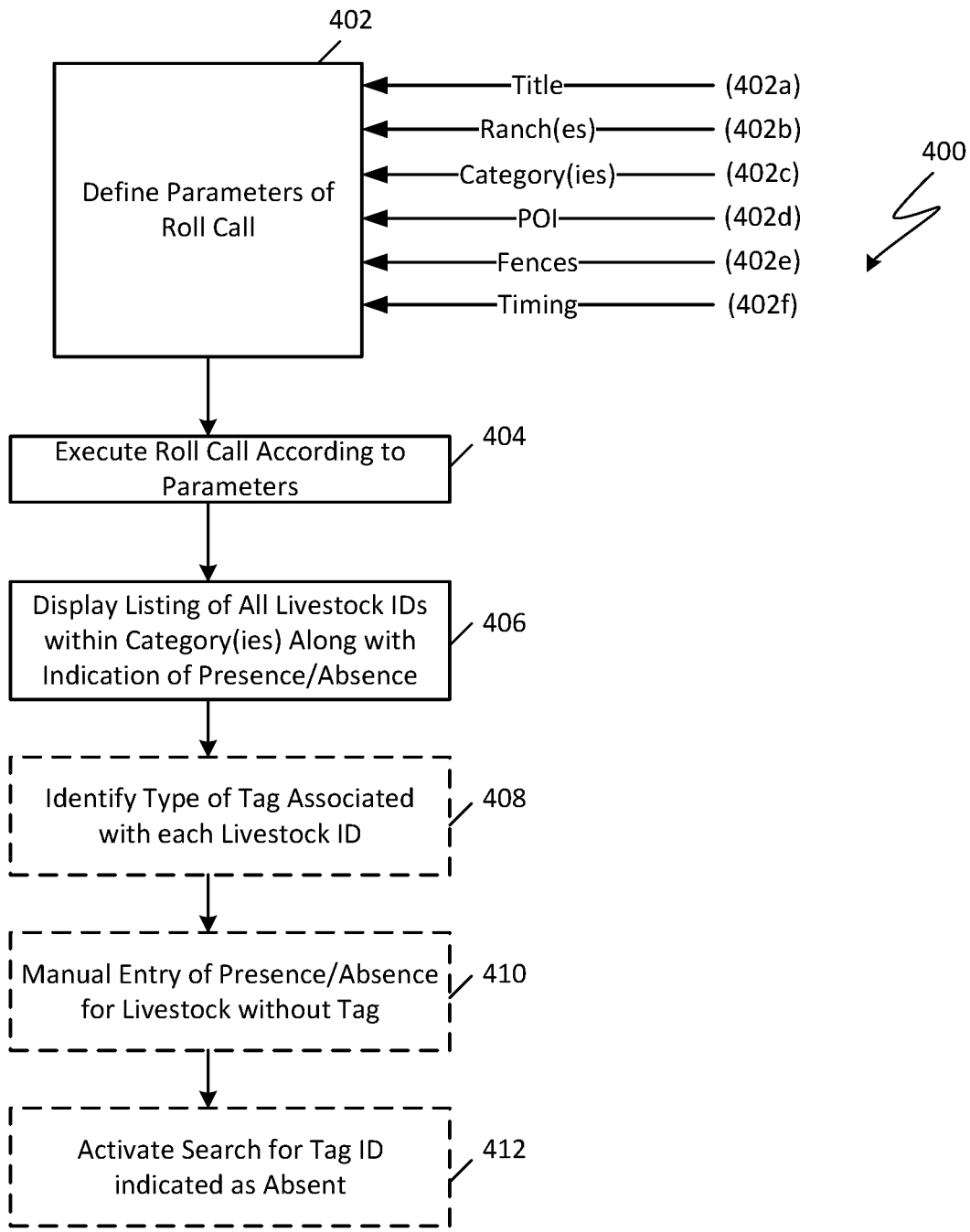
FIG. 10 is a flow chart illustrating a roll call procedure according to the present disclosure.

The procedure 400 of the roll call feature is illustrated in FIG. 10. As shown, the roll call procedure 400 begins by defining the parameters of the roll call, per block 402. The parameters of a roll call can include, but are not limited to, one or more of the following: (402a) a title with the title identifying the specific roll call that is being performed; (402b) a name of a ranch, farm, or other location where livestock are found; (402c) one or more categories of livestock that has been established within the livestock management system 10 and that the user wishes to include in the roll call, e.g., male calves, female calves, vaccinated cows, sick livestock, etc.; (402d) one or more points of interest of consideration for the roll call wherein the points of interest have been established within the livestock management system 10 and are points around which livestock may gather such as a water tank or a mineral provision area, etc.; one or more local sensors and/or transceivers 34 can optionally be associated with the point of interest; (402e) one or more fences/fence boundaries that have been established as existing fences/boundaries within the livestock management system 10—in certain embodiments, each fence/boundary is optionally associated with one or more local sensors and/or transceivers 34; and in certain embodiments two or more fences (and, if utilized, their respective optional local sensors and/or transceivers 34) can be selected as a parameter to define a fence-enclosed area; and (402f) timing of the roll call including, for example, the time at which the roll call is to start, wherein the start time is a pre-scheduled time or the start time is initiated via user-activation, and/or the duration of a roll call, e.g., pre-determined as one or more minutes, one or more hours, one or more days, or until the roll call is ended via user-action. The parameters of the roll call can be preprogrammed or manually entered at a time prior to execution of the roll call. A greater number or fewer number of parameters than those provided above can be used in executing a roll call based on user-preferences.

Execution of the roll call, typically by a mobile device, is then executed according to the defined parameters, per block 404. During execution the mobile device operates to receive unique tag identifiers from one or more of basic tags 230, enhanced basic tags 231, and/or advanced tags 20 that are attached to livestock 12 and are within short range communication (e.g., Bluetooth); while short range communication is the preferred communication method for a roll call, long range communication alternatively or additionally may be used by the mobile device to receive the unique tag identifiers. During execution of the roll call, the mobile device can be maintained in a fixed position, can be near a roll call point of interest and/or fence as noted in the roll call parameters, and/or moved about any desired area or perimeter, in which the livestock 12 are located. The unique tag identifiers from the advanced tags 20, basic tags 230, and/or enhanced basic tags 231 transmitted to the mobile device can be stored thereon. The unique tag identifiers are subsequently transmitted from the mobile device during roll call, along with a location of the mobile device during roll call, and a date and/or time that the transmissions from the respective advanced tags 20, basic tags 230 and/or enhanced basic tags 231, were received at the mobile device during roll call, to the livestock management system 10 for storage and establishing a location history of the livestock within the livestock management system 10; any data may additionally be stored at the mobile device itself. The location assigned to each of the respective tags in this instance can comprise the location generated by a GNSS of the mobile device. In certain embodiments, the location generated by a respective advanced tag 20 is used in place of the location of the mobile device within the livestock management system 10.

As the unique tag identifiers are received, the application on the mobile device, which is working in conjunction with the livestock management system 10, generates and displays on the mobile device a listing of the received unique tag identifiers, per block 406. In certain embodiments, the listing has been prepopulated with unique tag identifiers that are expected to be found during the roll call based on the parameters. In this certain embodiment, as the unique tag identifiers are received, the prepopulated listing of unique tag identifiers are annotated with an indicator (e.g., color, words, icon, etc.) to illustrate the actual receipt of the unique tag identifier and the presumed presence of the livestock 12 to which the unique tag identifier is associated. Those prepopulated unique tag identifiers not annotated as present (e.g., the unique tag identifier has not been received at the mobile device) can be annotated as absent.

In certain embodiments, the listing of unique tag identifiers additionally includes providing, on at least a portion of the listed unique tag identifiers, an indication of the type of tag (e.g., basic tag 230, enhanced basic tag 231 or advanced tag 20) with which the listed unique tag identifier is associated, per block 408. In certain embodiments, a user-interface of the mobile device to the listing of prepopulated unique tag identifiers enables a user to manually enter/mark one or more unique tag identifiers as absent and/or present, per block 410. In certain embodiments, the application on the mobile device, which is operating in conjunction with the livestock management system 10, enables a user, via a user interface (e.g., keyboard, touchscreen, etc.), to request a search for a specific unique tag identifier that is currently marked as absent, per block 412. In response to the request, the application will add the specific unique tag identifier to a sub-listing of tags under search and keep the roll call open for the specific unique tag identifiers under search while the roll call will be closed to all other unique tag identifiers. Consequently, as the mobile device moves through various locations, a transmission receipt of the one or more specific unique tag identifiers will result in the specific unique tag identifier being annotated as present and the roll call with regard to the specific unique tag identifier will be closed. As noted herein, a location of the specific unique tag identifier is associated with the received transmission of the specific unique tag identifier at the mobile device enabling a user to physically locate the livestock 12 associated with the specific unique tag identifier and physically relocate the livestock 12 if desired.

Returning to FIG. 9 and the location tracking of a livestock 12 throughout their lifetime, the roll call procedure 400 can be utilized to track the location of the livestock as it is transported for slaughter (or transported for any other purpose), per block 314. For example, prior to the livestock 12 being loaded for transport a roll call of the livestock 12 in a loading pen can be performed, as requested via a user interface of a mobile device, to produce a listing of unique tag identifiers of the livestock present; each transmission of the unique tag identifiers to the mobile device is associated with a location, such as the GNSS location of the mobile device or advanced tag 20, as well as the date and/or time of the reception of the unique tag identifier at the mobile device. The location of the mobile device as well as a time of reception of the unique identifier at the mobile device during roll call is saved in association with the unique tag identifier (e.g., the location of the mobile device is saved as the location of the tag associated with the unique identifier) at the mobile device and/or the livestock inventory management system 10. A similar roll call of the livestock 12 within the transport vehicle as it travels to its final destination can also be performed to monitor the locations through which the transport vehicle and livestock 12 travel. A similar roll call of the livestock 12 having exited the transport vehicle into holding pen can be performed to track a final location of the livestock 12.

In certain embodiments, the roll call listing of unique tag identifiers generated prior to or during transport can be converted to and utilized as a check-in list for the final destination of the livestock 12. For example, a check-in procedure can be activated within the mobile device in association with a previously generated roll call listing such that as a livestock passes the mobile device at a final destination and transmits its unique tag identifier through short range communication (and/or long range communication) with the mobile device an annotated status on the generated roll call listing is changed from present to checked-in. In certain embodiments, the roll call procedure prior to, during, and/or subsequent to transport of the livestock 12 can be performed by a local sensor and/or transceiver 34 (e.g., base station) located within the transport vehicle as directed by a mobile device and/or livestock management system 10.

In certain embodiments, the unique tag identifiers of the transported livestock 12 are removed from the current livestock management system 10 and imported into a new livestock management system 10 associated with and/or operated by the final destination location where, if desired, the location of the transported livestock 12 can continued to be tracked by the new livestock management system 10.

In certain embodiments, for example, at a final destination location to which livestock 12 have been transported, locations may no longer be tracked by the new livestock management system 10. Rather, the new livestock management system interfaces with directional antennas to capture the livestock coming down a single lane alleyway, in a chute or being loaded onto or off of a vehicle. In certain embodiments, one or both of the old or new livestock management systems 10 may track locations and/or operation of directional antennas.

With the various locations and dates (and/or times) saved in association with the unique tag identifier of a basic tag 230 or enhanced basic tag 231 (or advanced tag 20), a timeline history of locations of the basic tag 230 or enhanced basic tag 231 (or the advanced tag 20), and the livestock animal associated therewith, can be generated by the livestock management system 10 and displayed (e.g. on a display of a computing device), printed, transmitted etc. via various user interfaces and/or peripherals of the computing devices of the livestock management system 10.

It should be noted that short range communication refers to any communication protocol requiring proximity between transmitting and receiving devices while long range communication refers to any communication protocol wherein proximity is not required between transmitting and receiving devices.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A procedure for tracking livestock, comprising:
    attaching a first tag to a livestock animal, wherein the first tag transmits a first unique tag identifier via short range communication, wherein the first tag is incapable of long range communication;
    establishing the first unique tag identifier within a livestock management system;
    receiving the first unique tag identifier at a local sensor and transceiver having a location;
    transmitting to the livestock management system from the local sensor and transceiver:
        the first unique tag identifier;
        a date of reception of the first unique tag identifier having been received at the local sensor and transceiver; and
        a location of the local sensor and transceiver;
    storing within the livestock management system the location of the local sensor and transceiver as a first location in association with the first unique tag identifier; storing within the livestock management system the date of reception of the first unique tag identifier having been received at the local sensor and transceiver as a first date associated with both the first tag identifier and the first location;
    generating, with the livestock management system, a history of locations of the livestock animal associated with the first tag identifier based on the first date and the first location;
    receiving the first unique tag identifier at a second tag;
    transmitting to the livestock management system from the second tag:
        the first unique tag identifier;
        a date of reception of the first unique tag identifier having been received at the second tag; and
        a location of the second tag;
    storing within the livestock management system the location of the second tag as a second location in association with the first unique tag identifier;
    storing within the livestock management system the date of reception of the first unique tag identifier having been received at the second tag as a second date associated with both the first unique tag identifier and the second location;
    generating, with the livestock management system, the history of locations of the livestock animal associated with the first unique tag identifier based on the second date and the second location receiving the first unique tag identifier at a mobile device;
transmitting to the livestock management system from the mobile device:
the first unique tag identifier;
a date of reception of the first unique tag identifier having been received at the mobile device; and
a location of the mobile device;
storing within the livestock management system the location of the mobile device as a third location in association with the first unique tag identifier;
storing within the livestock management system the date of reception of the first unique tag identifier having been received at the mobile device as a third date associated with both the first unique tag identifier and the third location; and
generating, with the livestock management system, the history of locations of the livestock animal associated with the first unique tag identifier based on the third date and the third location.

2. The procedure for tracking livestock of claim 1, wherein the local sensor and transceiver are positioned at a point of interest that includes one or more of a water tank, a mineral provision location, a feed provision location, a scale, a gate, a chute, a fence, a pen, and a boundary.

3. The procedure for tracking livestock of claim 1, wherein the local sensor and transceiver are positioned within a livestock transport vehicle.

4. The procedure for tracking livestock of claim 1, wherein the first tag includes a power source, a processor, a memory and a short range transceiver and is incapable of generating a location.

5. The procedure for tracking livestock of claim 4, wherein the first tag additionally includes at least one of an inertial measurement unit (IMU) and a radio frequency identification (RFID) transceiver.

6. The procedure for tracking livestock of claim 1, wherein the second tag includes a global navigation satellite system (GNSS) receiver and cellular transmission capabilities.

7. A procedure for tracking livestock, comprising:
attaching a first tag to a livestock animal, wherein the first tag transmits a first unique tag identifier via short range communication, wherein the first tag is incapable of long range communication;
establishing the first unique tag identifier within a livestock management system;
receiving the first unique tag identifier at a local sensor and transceiver having a location;
transmitting to the livestock management system from the local sensor and transceiver:
the first unique tag identifier;
a date of reception of the first unique tag identifier having been received at the local sensor and transceiver; and
a location of the local sensor and transceiver;
storing within the livestock management system the location of the local sensor and transceiver as a first location in association with the first unique tag identifier;
storing within the livestock management system the date of reception of the first unique tag identifier having been received at the local sensor and transceiver as a first date associated with both the first tag identifier and the first location;
activating at a mobile device a roll call procedure having one or more parameters, the one or more parameters of the roll call procedure being predefined within the livestock management system;
responsive to activation of the roll call procedure, generating at the mobile device a listing of a plurality of unique tag identifiers expected to meet the one or more parameters including the first unique tag identifier of the first tag;
receiving the first unique tag identifier at the mobile device;
indicating that the received first unique tag identifier is present within the listing of the plurality of unique tag identifiers;
based on the first unique tag identifier being present within the listing of the plurality of unique tag identifiers, transmitting to the livestock management system from the mobile device:
the first unique tag identifier;
a date of reception of the first unique tag identifier having been received at the mobile device during roll call; and
a location of the mobile device during roll call;
storing within the livestock management system the location of the mobile device during roll call as a second location in association with the first unique tag identifier;
storing within the livestock management system the date of reception of the first unique tag identifier having been received at the mobile device during roll call as a second date associated with both the first unique tag identifier and the second location; and
generating, with the livestock management system, the history of locations of the livestock animal associated with the first unique tag identifier based on the second date and the second location.

8. The procedure for tracking livestock of claim 7, wherein activating the roll call procedure comprises activating the roll call procedure prior to vehicle transport loading of the livestock.

9. The procedure for tracking livestock of claim 7, wherein activating the roll call procedure comprises activating the roll call procedure during vehicle transport of the livestock.

10. The procedure for tracking livestock of claim 7, wherein activating the roll call procedure comprises activating the roll call procedure subsequent vehicle transport of the livestock.

11. The procedure for tracking livestock of claim 10, wherein the listing of the plurality of unique tag identifiers is converted to a livestock check-in list.

12. A procedure for tracking livestock comprising:
attaching a first tag to a livestock animal, wherein the first tag transmits a first unique tag identifier via short range communication, and wherein the first tag is incapable of long range communication;
establishing the first unique tag identifier within a livestock management system;
(a) receiving the first unique tag identifier at a local sensor and transceiver, and transmitting to the livestock management system from the local sensor and transceiver:
the first unique tag identifier;
a date of reception of the first unique tag identifier having been received at the local sensor and transceiver; and
a location of the local sensor and transceiver;
(b) receiving the first unique tag identifier at a second tag and transmitting to the livestock management system from the second tag:

the first unique tag identifier;
a date of reception of the first unique tag identifier having been received at the second tag; and
a location of the second tag;

(c) receiving the first unique tag identifier at a mobile device and transmitting to the livestock management system from the mobile device:
the first unique tag identifier;
a date of reception of the first unique tag identifier having been received at the mobile device; and
a location of the mobile device;

storing within the livestock management system:
(a) the location of the local sensor and transceiver as a first location in association with the first unique tag identifier and date of reception of the first unique tag identifier having been received at the local sensor and transceiver as a first date associated with the first unique tag identifier and the first location;
(b) the location of the second tag as a second location in association with the first unique tag identifier and date of reception of the first unique tag identifier having been received at the second tag as a second date associated with the first unique tag identifier and the second location;
(c) the location of the mobile device as a third location in association with the first unique tag identifier and the date of reception of the first unique tag identifier having been received at the mobile device as a third date associated with the first unique tag identifier and the third location; and generating, with the livestock management system, a history of locations of the livestock animal associated with the first unique tag identifier based on the first date and first location, the second date and second location, and the third date and third location.

13. The procedure for tracking livestock of claim 12, further comprising displaying the history of location of the livestock on an application interface.

14. The procedure for tracking livestock of claim 12, further comprising:
activating at the mobile device a roll call procedure;
responsive to the roll call procedure, generating at the mobile device a listing of a plurality of unique tag identifiers including the first unique tag identifier;
indicating that the received first unique tag identifier is present within the listing of the plurality of unique tag identifiers;
based on the first unique tag identifier being present within the listing of the plurality of unique tag identifiers, transmitting to the livestock management system from the mobile device:
the first unique tag identifier;
a date of reception of the first unique tag identifier having been received at the mobile device during roll call;
a location of the mobile device during roll call;
storing within the livestock management system the location of the mobile device during roll call as a fourth location in association with the first unique tag identifier;
storing within the livestock management system the date of reception of the first unique tag identifier having been received at the mobile device during roll call as a fourth date associated with both the first unique tag identifier and the fourth location; and
generating, with the livestock management system, the history of locations of the livestock animal associated with the first unique tag identifier based on the fourth date and the fourth location.

15. The procedure for tracking livestock of claim 14, wherein roll call procedure is defined by one or more parameters defined within the livestock management system.

16. The procedure for tracking livestock of claim 15, wherein the one or more parameters include at least one of: (a) a roll call title; (b) a location of the roll call; (c) a category of livestock to be included in the roll call; (d) a point of interest; (e) a fence; (f) a timing of the roll call.

17. The procedure for tracking livestock of claim 14, further comprising indicating a type of tag associated with the unique tag identifier for at least a portion of the unique tag identifiers within the listing of the plurality of unique tag identifiers, where the type of tag comprises at least one of an advanced tag, a basic tag and an enhanced basic tag.

18. The procedure for tracking livestock of claim 14, wherein the listing of the plurality of unique tag identifiers is converted to a livestock check-in list.

* * * * *